United States Patent [19]

Hase et al.

[11] 4,208,613

[45] Jun. 17, 1980

[54] LOW-VELOCITY ELECTRON EXCITED FLUORESCENT DISPLAY DEVICE

[75] Inventors: Takashi Hase, Fujisawa; Akiyasu Kagami, Ninomiyamachi Kawawa; Yoshiyuki Mimura, Kamakura; Kinichiro Narita, Chigasaki; Minoru Hiraki, Chigasaki, all of Japan

[73] Assignee: Dai Nippon Toryo Co., Ltd., Osaka, Japan

[21] Appl. No.: 889,540

[22] Filed: Mar. 23, 1978

Related U.S. Application Data

[60] Continuation of Ser. No. 759,842, Jan. 17, 1977, abandoned, which is a division of Ser. No. 701,128, Jun. 30, 1976, abandoned.

[30] Foreign Application Priority Data

| | | |
|---|---|---|
| Jun. 30, 1975 [JP] | Japan | 50-80607 |
| Jun. 30, 1975 [JP] | Japan | 50-80608 |
| Jul. 3, 1975 [JP] | Japan | 50-82201 |
| Jul. 3, 1975 [JP] | Japan | 50-82202 |
| Jul. 4, 1975 [JP] | Japan | 50-81948 |
| Jul. 4, 1975 [JP] | Japan | 50-81949 |

[51] Int. Cl.² .................. H01J 29/20; C09K 11/18
[52] U.S. Cl. .................................................. 313/495
[58] Field of Search ............... 252/301.6 S; 313/496, 313/495

[56] References Cited

U.S. PATENT DOCUMENTS

3,906,269  9/1975  Tanji .................................. 313/496

OTHER PUBLICATIONS

Nitta et al. "Chem. Abstracts" vol. 83, 1975, 140923s.

Primary Examiner—Jack Cooper

[57] ABSTRACT

Fluorescent compositions which contain indium oxide and one phosphor selected from the group hereinafter defined in a weight ratio within the range of 1/9 to 9/1, and fluorescent display devices having said fluorescent compositions in the form of a fluorescent screen, which can emit green, blue or red light under low-velocity electron excitation, said group consisting of a terbium activated lanthanum oxysulfide phosphor or a terbium activated lanthanum yttrium oxysulfide phosphor [$(La_{1-x},Y_x)_2O_2S:Tb$, wherein $0 \leq x < 1$], a copper and aluminium activated zinc cadmium sulfide phosphor [$(Zn_{1-x},Cd_x)S:Cu, Al$, wherein $0 \leq x \leq 0.1$], a europium activated strontium gallium sulfide phosphor ($SrGa_2S_4:Eu^{2+}$), a cerium activated yttrium aluminium gallate phosphor [$Y_3(Al_{1-y},Ga_y)_5O_{12}:Ce$, wherein $0 \leq y \leq 0.5$], a manganese activated zinc silicate phosphor ($Zn_2SiO_4:Mn$), a terbium activated yttrium oxysulfide phosphor ($Y_2O_2S:Tb$), a silver activated zinc sulfide phosphor ($ZnS:Ag$), a europium activated yttrium oxysulfide phosphor ($Y_2O_2S:Eu$), a europium activated yttrium oxide phosphor ($Y_2O_3:Eu$), and a europium activated yttrium vanadate phosphor ($YVO_4:Eu$).

2 Claims, 41 Drawing Figures

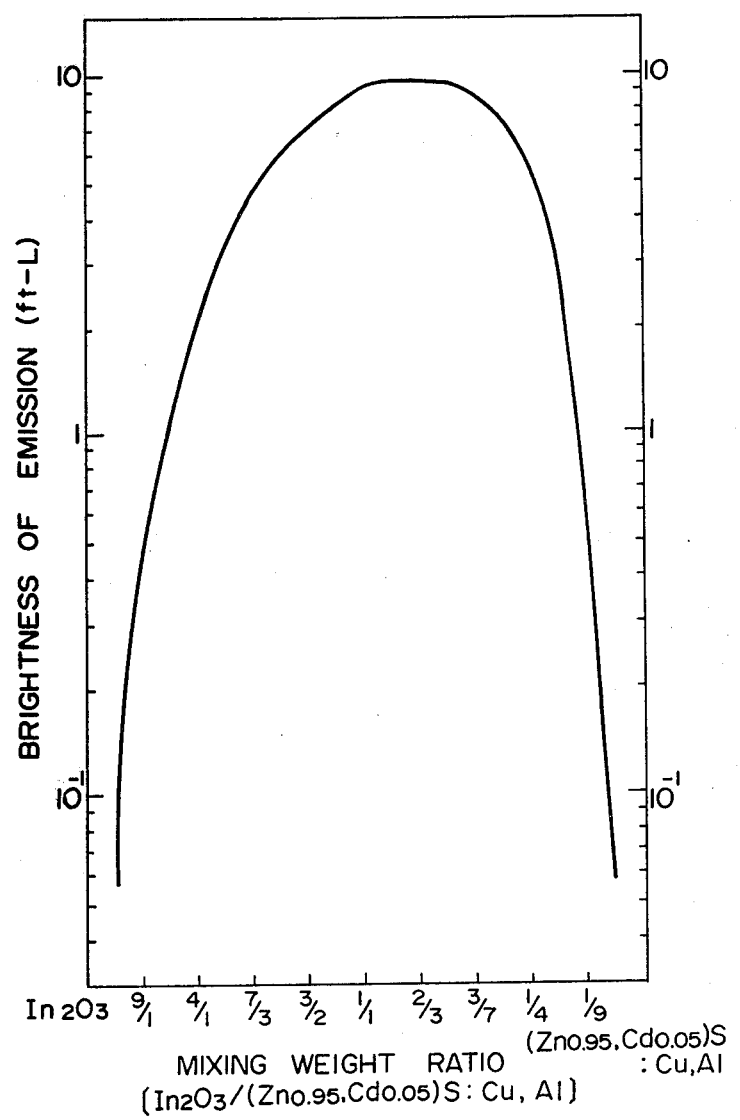

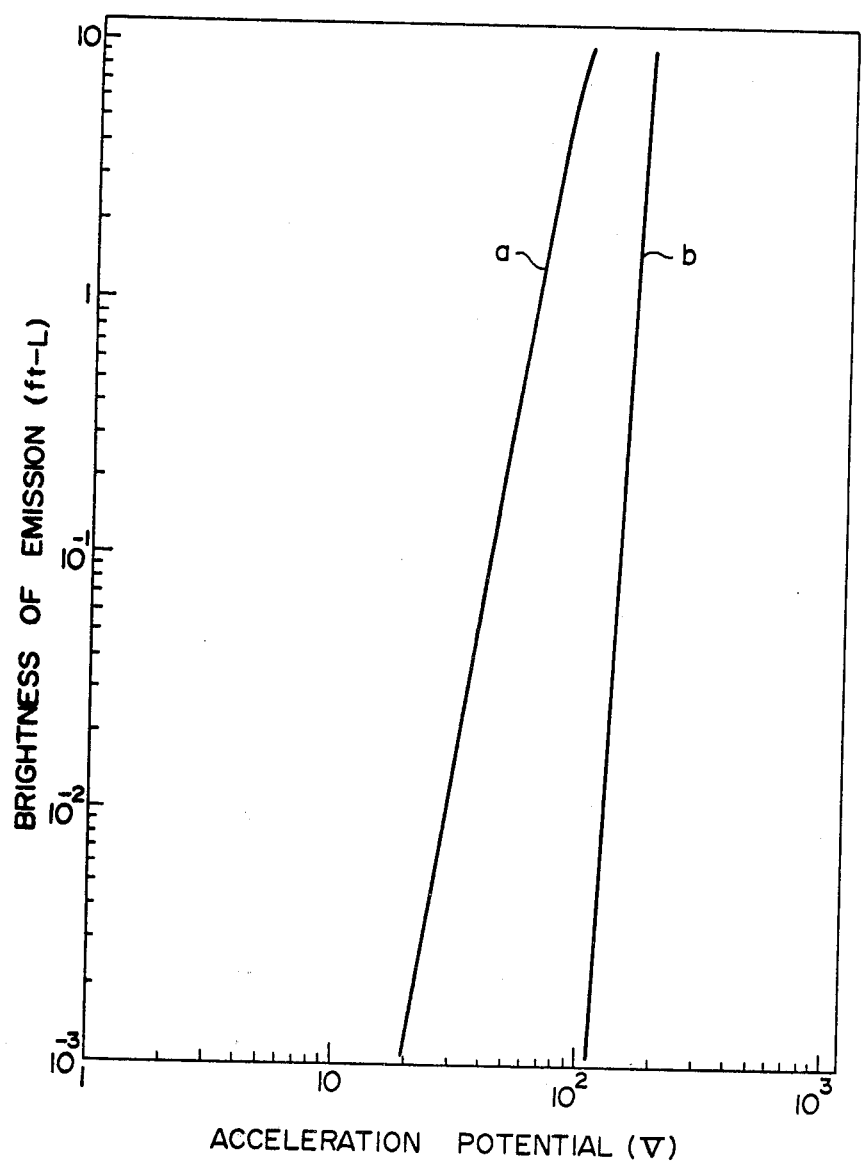

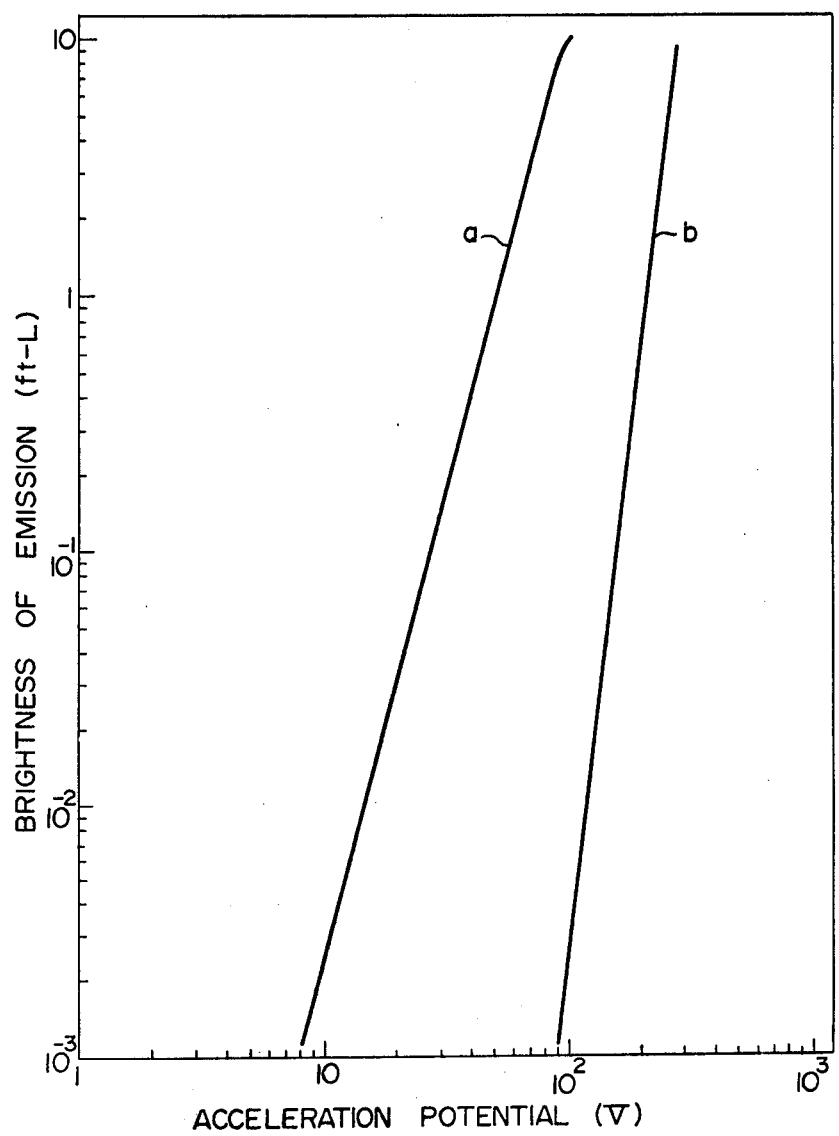

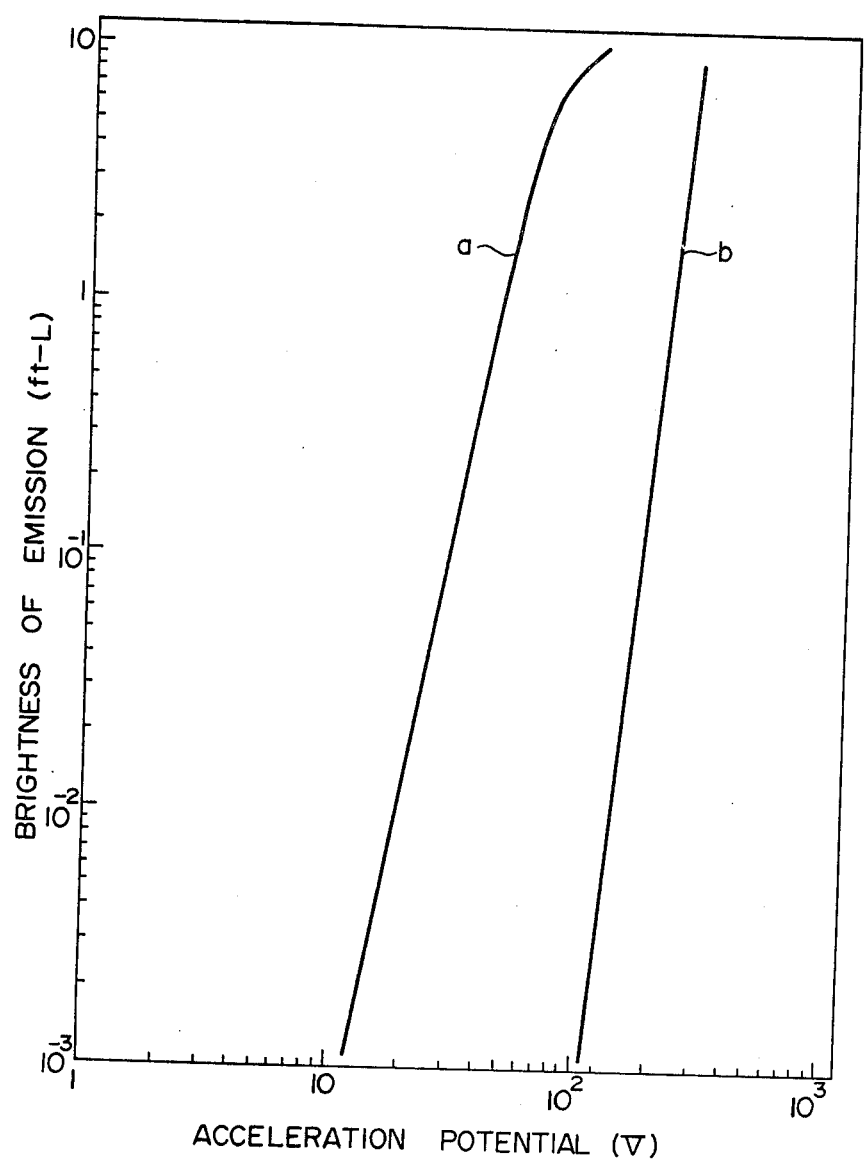

F I G. 5A
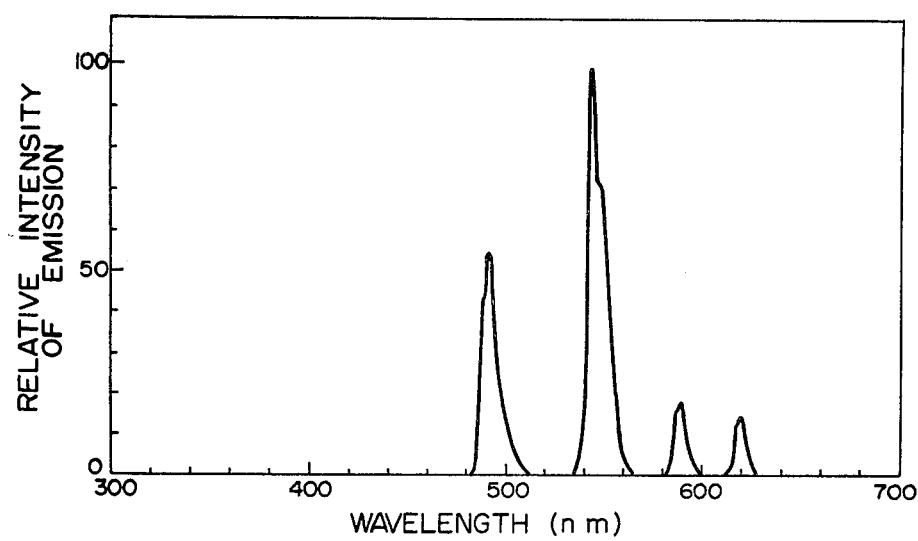
F I G. 5B
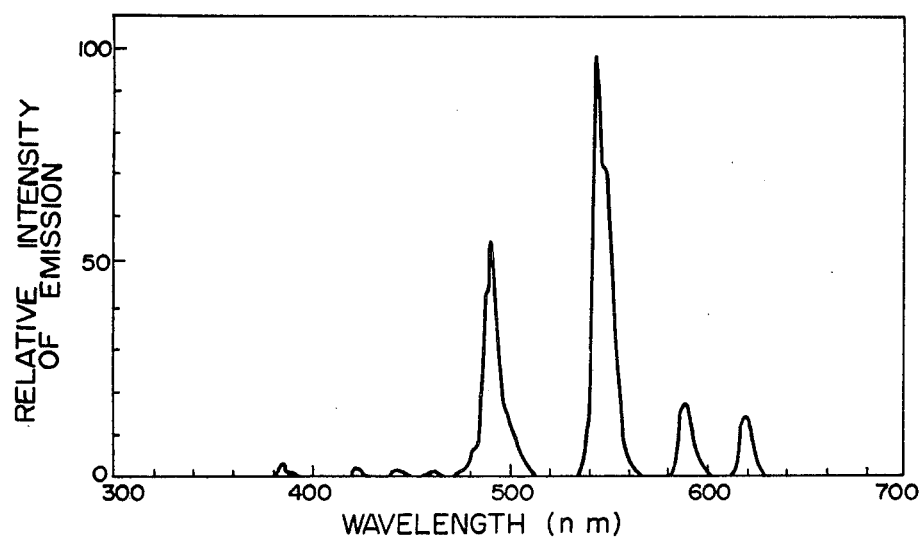

LOW-VELOCITY ELECTRON EXCITED FLUORESCENT DISPLAY DEVICE

This is a continuation, of application Ser. No. 759,842, filed Jan. 17, 1977, which in turn is a division of application Ser. No. 701,128 filed June 30, 1976 both now abandoned.

BACKGROUND OF THE INVENTION

1. Field of the Invention

This invention relates to novel fluorescent compositions and low-velocity electron excited fluorescent display devices utilizing the same, and more particularly is concerned with novel fluorescent compositions which can display emission having high luminance in a high state of color purity under low-velocity, electron excitation, and low-velocity electron excited fluorescent display devices containing as a fluorescent screen these fluorescent compositions.

2. Description of the Prior Art

Recently, a low-velocity electron excited fluorescent display device (hereinafter referred to as "fluorescent display device") have been widely employed as a display device for desk top electronic calculators and various kinds of measuring instruments. As is well known, the fluorescent device of this kind in general has a fundamental structure such that both an anodic plate having a fluorescent screen on one side thereof and a cathode standing face to face with the above-described fluorescent screen are enclosed in an evacuated tube wherein the fluorescent screen placed on the anodic plate is excited by low-velocity electrons emitting from the cathode to result in emission of light of certain wavelengths. Both FIGS. 1 and 2 give outlines of typical structures of fluorescent display devices, and they show a diode type display tube and a triode type display tube, respectively. As shown in both FIG. 1 and FIG. 2, one side of an anodic plate 11 made of, e.g., an aluminium plate, has a fluorescent screen 12 thereon. The other side of the anodic plate 11 is supported by a ceramic base plate 13. The diode type display tube is equipped with a cathode standing face to face with the above-described fluorescent screen 12 placed on the one side of the anodic plate 11, and emission occurs by excitation of the fluorescent screen 12 which arises from low-velocity electrons emitted from the cathode 14. In particular, the triode type display tube shown in FIG. 2 additionally has a grid electrode 15 between the cathode 14 and the fluorescent screen 12 so as to control or diverge low-velocity electrons emitted from the cathode 14. Moreover, when the surface of the fluorescent screen 12 has wide area, two or more cathodes may be additionally placed in both fluorescent display tubes shown in FIG. 1 and FIG. 2 wherein only one cathode is placed, and there is no particular limit to the number of cathodes that can be placed therein. The aforesaid anodic plate 11 having a fluorescent screen 12 on one side thereof, the ceramic base plate 13 and the cathode 14 (which are shown in FIG. 1), or the aforesaid anodic plate 11 having a fluorescent screen 12 on one side thereof, the ceramic base plate 13, the cathode 14 and the grid electrode 15 (which are shown in FIG. 2) are enclosed in a transparent container 16, made of, for example, glass, the pressure inside which is held at a high vacuum of $10^{-5}$ to $10^{-9}$ Torr.

Zinc activated zinc oxide phosphors (ZnO:Zn) have been commonly known as phosphors employed for the above-described fluorescent display devices which can emit light of high luminance under low-velocity electron excitation occurring under certain conditions, particularly under acceleration potential below 100 V. Phosphors of this kind can be prepared by firing zinc oxide (ZnO) alone in a reducing atmosphere, or by firing ZnO contaminated with a slight amount of a certain zinc compound other than ZnO such as zinc sulfide (ZnS) or the like in air, and they can give forth greenish white emission of high luminance when excited by low-velocity electrons. Fluorescent display devices having the fluorescent screen made of the aforesaid (ZnO:Zn) have been commercially used as display devices for, e.g., desk top electronic calculators and various kinds of measuring instruments. However, aside from (ZnO:Zn) almost no phosphors are known which can emit light under low-velocity electron excitation, and therefore, fluorescent display devices equipped with fluorescent screens contaning phosphors other than (ZnO:Zn) are rare at the present stage of this art. Emission color of (ZnO:Zn) is greenish white as described above, and therefore a fluorescent display device utilizing (ZnO:Zn) has inadequate color purity as a green emitting display. Accordingly, the present invention is aimed at providing green emitting compositions and fluorescent display devices using them which can emit green light in a high state of color purity. In addition, the present invention is also aimed at providing fluorescent compositions capable of emitting light of specific wavelengths, other than greenish ones, in high luminance and at providing fluorescent display devices utilizing them.

SUMMARY OF THE INVENTION

One object of the present invention is to provide novel fluorescent compositions which can give forth emission of high luminance in a high state of color purity under low velocity electron excitation which occurs under certain conditions, particularly under acceleration potential below 100 V.

Another object of the present invention is to provide novel green emitting compositions which can give forth green emission of high luminance in a high state of color purity under low-velocity electron excitation occurring under certain conditions, particularly under acceleration potential below 100 V.

A further object of the present invention is to provide novel blue emitting compositions which can give forth blue emission of high luminance in a high state of color purity under low-velocity electron excitation occurring under certain conditions, particularly under acceleration potential below 100 V.

still another object of the present invention is to provide novel red emitting compositions which can give forth red emission of high luminance in a high state of color purity under low-velocity electron excitation occurring under certain conditions, particularly under acceleration potential below 100 V.

Another object of the present invention is to provide fluorescent display devices which can display emission having both high luminance and high color purity.

A further object of the present invention is to provide fluorescent display devices which can display green emission having both the luminance and high color purity.

Still another object of the present invention is to provide fluorescent display devices which can display blue emission having both high luminance and high color purity.

Another object of the present invention is to provide fluorescent display devices which can display red emission having both high luminance and high color purity.

Other objects of the present invention will become apparent from a consideration of the following description and examples.

These objects can be attained with fluorescent compositions containing indium oxide ($In_2O_3$) and one phosphor selected from the following group in a weight ratio ranging from 1:9 to 9:1, said group consisting of a terbium activated lanthanum oxysulfide phosphor or a terbium activated lanthanum yttrium oxysulfide phosphor [$(La_{1-x}, Y_x)_2O_2S:Tb$, wherein $0 \leq x < 1$], a copper and aluminium activated zinc cadmium sulfide phosphor [$(Zn_{1-x}, Cd_x)S:Cu, Al$, wherein $0 \leq x \leq 0.1$], a europium activated strontium gallium sulfide phosphor ($SrGa_2S_4:Eu^{2+}$), a cerium activated yttrium aluminium gallate phosphor [$Y_3(Al_{1-y}, Ga_y)_5O_{12}:Ce$, wherein $0 \leq y \leq 0.5$], a manganese activated zinc silicate phosphor ($Zn_2SiO_4:Mn$), a terbium activated yttrium oxysulfide phosphor ($Y_2O_2S:Tb$), a silver activated zinc sulfide phosphor ($ZnS:Ag$), a europium activated yttrium oxysulfide phosphor ($Y_2O_2S:Eu$), a europium activated yttrium oxide phosphor ($Y_2O_3:Eu$), and a europium activated yttrium vanadate phosphor ($YVO_4:Eu$).

Moreover, some objects of the present invention can be attained with fluorescent display devices having the above-described fluorescent compositions as a component of a fluorescent screen.

BRIEF DESCRIPTION OF THE DRAWINGS

FIGS. 3A to 3M illustrate the dependence of luminance of emission on the mixing weight ratio of the amount of $In_2O_3$ to that of the phosphor contained in a fluorescent composition provided in the present invention under low-velocity electron excitation, FIGS. 4A to 4M are diagrams illustrating the relationships between brightness of emission, which each of the fluorescent compositions of the present invention and the phosphor alone comprised therein give forth, and the acceleration potential applied to each of them, FIGS. 5A to 5L are emission spectra of the respective fluorescent compositions of the present invention and the conventional one.

DESCRIPTION OF THE PREFERRED EMBODIMENTS

Figure 1:
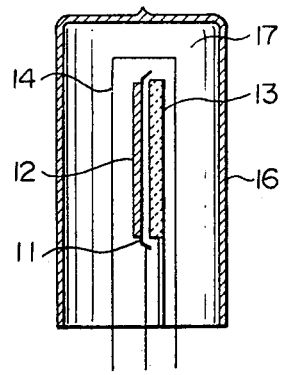
FIG. 1 and FIG. 2 are structural outlines of typical examples of fluorescent display devices wherein a diode type display tube is shown in FIG. 1 and a triode type display tube is shown in FIG. 2.

All the fluorescent compositions provided in the present invention which contain a certain composition capable of emitting green, blue or red light under low-velocity electron excitation are characterized by containing $In_2O_3$ as an essential component.

Commercially available reagent grade $In_2O_3$ (termed as "reagent $In_2O_3$" hereinafter) may be used as the $In_2O_3$ which is one of the important components of the present invention without any purifying treatments. Besides reagent $In_2O_3$, indium oxides produced by firing in air, neutral atmosphere or weak-reducing atmosphere indium compounds of the kind which can easily be converted to indium oxide at high temperature, such as indium sulfate, indium nitrate, indium chloride, etc., (termed as "fired $In_2O_3$" or "heat treated $In_2O_3$" hereinafter) can also be employed. Appropriate firing temperatures for producing fired $In_2O_3$ were found to be below the melting point, 2000° C. Temperatures not higher than 1500° C. were further desirable in view of the performance of the sintering apparatus. The fired $In_2O_3$ has more stable temperature characteristic than the reagent $In_2O_3$. Therefore, the compositions prepared by use of the fired $In_2O_3$ have higher stability in light emission than those prepared by use of the reagent $In_2O_3$.

The phosphors which correspond to the other component of the fluorescent compositions provided in the present invention including phosphor (1) having the formula [$(La_{1-x}, Y_x)_2O_2S:Tb$], phosphor (2) [$(Zn_{1-x}, Cd_x)S:Cu, Al$], phosphor (3) [$SrGa_2S_4:Eu^{2+}$], phosphor (4) [$Y_3(Al_{1-y}, Ga_y)_5O_{12}:Ce$], phosphor (5) [$Zn_2SiO_4:Mn$], phosphor (6) [$Y_2O_2S:Tb$], phosphor (7) [$ZnS:Ag$], phosphor (8) [$Y_2O_2S:Eu$], phosphor (9) [$Y_2O_3:Eu$] and phosphor (10) [$YVO_4:Eu$] can, in general, be produced in accordance with the following process.

Phosphor (1) may be prepared as follows: Lantanum oxide ($La_2O_3$) and yttrium oxide ($Y_2O_3$) are mixed in a molar ratio of (1-x) mole of the former to x mole of the latter. To the resulting mixture there is added prescribed amount of a terbium oxide ($Tb_2O_3$), and they are mixed. Further, to the rare earth oxide there are added 20 to 40 weight % of sulfur (S) and 20 to 40 weight % of sodium carbonate ($Na_2CO_3$). Then, they are fired in air at a temperature ranging from about 1200° C. to about 1300° C. for periods of about one hour to about five hours. The preferred amount of an activator corresponding to either Cu or Al which is suitable for phosphor (1) is within the range of $10^{-2}$ to $1.5 \times 10^{-1}$ gram, and more preferably $5 \times 10^{-2}$ to $6 \times 10^{-2}$ gram, per one gram of a host material $(La_{1-x}, Y_x)_2O_2S$.

The aforesaid rare earth oxide mixture group consisting of $Y_2O_3$, $La_2O_3$ and $Tb_2O_3$ may be produced simply by physically mixing these ingredients, but it should, in general, be prepared by once dissolving these ingredients in a mineral acid with the intention of improving upon the miscibility thereof, adding an aqueous solution of oxalic acid thereto to coprecipitate yttrium oxalate, lanthanum oxalate and terbium oxalate, and then pyrolyzing the resulting coprecipitated rare earth oxalate mixture.

Phosphor (2) may be prepared as follows: Chemically precipitated zinc sulfide (ZnS) and chemically precipitated cadmium sulfide (CdS) are mixed in a molar ratio of (1-x) mole of the former to x mole of the latter (, wherein the value x is within the range of $0 \leq x \leq 0.1$). To the resulting sulfide mixture there are added both the prescribed amount of a copper compound such as copper sulfate ($CuSO_4.5H_2O$) or the like and the prescribed amount of an aluminium compound such as aluminium sulfate [$Al_2(SO_4)_3.18H_2O$] or the like, and they are mixed thoroughly. Then, they are fired at a temperature ranging from about 900° C. to about 1200° C. for periods of about one hour to about five hours in a sulfuric atmosphere such as an atmosphere of hydrogen sulfide, sulfur or the like to produce phosphor (2).

The preferred amount of an activator corresponding to either Cu or Al which is suitable for phosphor (2) is within the range of $10^{-5}$ to $10^{-3}$ gram, and more preferably $5\times 10^{-5}$ to $5\times 10^{-4}$ gram, per one gram of a host material $(Zn_{1-x}, Cd_x)S$. When the affix x has a value larger than 0.1, the phosphor (2) emits light of longer wavelength, from yellow to red, with increasing value of x. Therefore, those compositions are unsuitable for those of components which constitute fluorescent compositions employed for green emitting fluorescent display devices of the present invention.

Phosphor (3) may be prepared by adding gallium oxide ($Ga_2O_3$) of high purity to a strontium compound which is easily alterable to the sulfide by heating in a sulfuric stream, such as strontium sulfate, strontium carbonate or strontium chloride, all of which must be of high purity, in equimolar amounts, additionally adding as an activator the prescribed amount of europium ion in the form of europium sulfate [$Eu_2(SO_4)_3$], europium nitrate [$Eu(NO_3)_3$] or europium oxide [$Eu_2O_3$] to the aforesaid oxide mixture, thoroughly mixing the resulting mixture, and then firing it at a temperature within the range of about 700° C. to about 1000° C., and more preferably about 800° C. to about 900° C., for about 3 to about 5 hours in a sulfuric stream of such as sulfur vapor, hydrogen sulfide gas, carbon disulfide gas or the like. The preferred amount of the activator Eu suitable for the phosphor (3) was within the range of $10^{-4}$ gram.atom to $5\times 10^{-1}$ gram.atom, and more particularly $5\times 10^{-3}$ gram.atom to $10^{-1}$ gram.atom, per mole of host material $SrGa_2S_4$.

Phosphor (4) may be prepared as follows: Yttrium oxide ($Y_2O_3$) or an yttrium compound easily alterable to $Y_2O_3$ at a high temperature, aluminium oxide ($Al_2O_3$) or an aluminium compound easily alterable to $Al_2O_3$ at a high temperature are mixed with $Ga_2O_3$ or a gallium compound easily alterable to $Ga_2O_3$ in a molar ratio of 5 moles of an oxide mixture, one mole of which is represented by the formula $(Al_{1-y}, Ga_y)_2O_3$ wherein y mole of $Ga_2O_3$ is mixed with (1-y) mole of $Al_2O_3$ under the condition of $0 \leq y \leq 0.5$, to 3 mole of $Y_2O_3$, and the prescribed amount of a cerium ion which is suitable for the phosphor (4) is further added to and mixed with the resulting oxide mixture in the form of cerium oxide ($Ce_2O_3$) or a cerium compound easily alterable to cerium oxide at a high temperature. The mixture is fired at a temperature within the range of about 1200° C. to about 1700° C., and preferably about 1400° C. to about 1600° C., for about one hour to about five hours in an air or in a weak-reducing atmosphere. It is preferred that the above-described firing treatment be repeated not less than twice. The preferred amount of the activator Ce appropriate to the phosphor (4) is within the range of $10^{-4}$ to $10^{-1}$ gram.atom and more particularly $10^{-3}$ to $5\times 10^{-2}$ gram.atom, per mole of a host material $Y_3(Al_{1-y}, Ga_y)_5O_{12}$. Among the compositions included within the scope of phosphor (4), those which have the affix y equal to a value larger than 0.5 were not suitable as a component of a fluorescent composition employed for the fluorescent display device of the present invention because of the fluorescent luminance decreases with increasing the value y.

Phosphor (5) may be prepared by mixing zinc oxide (ZnO) or a zinc compound easily alterable to ZnO at a high temperature with silicon dioxide ($SiO_2$) or a silicon compound easily alterable to $SiO_2$ at a high temperature in a molar ratio of 2 mole of ZnO to 1 mole of $SiO_2$, additionally mixing the resulting mixture oxide with the prescribed amount of manganese ion, an activator for the phosphor (3), in the form of manganese oxide (MnO) or a manganese compound easily alterable to MnO, and then firing them in air at a temperature within the range of about 1000° C. to about 1400° C., and more particularly about 1200° C. to about 1300° C., for about one hour to about five hours. The above-described firing process should be repeated not less than 2 times. The preferred amount of the activator Mn suitable for the phosphor (5) was within the range of $10^{-4}$ to $10^{-1}$ gram.atom, and more particularly $10^{-3}$ to $5\times 10^{-2}$ gram.atom, per mole of host material $Zn_2SiO_4$.

Phosphor (6) may be prepared by mixing yttrium oxide ($Y_2O_3$) with the prescribed amount of terbium oxide ($Tb_2O_3$), adding to the resulting rare earth oxide mixture 20 to 40 weight % of sulfur (S) and 20 to 40 weight % of sodium carbonate ($Na_2CO_3$) to act as a flux thereon, mixing them thoroughly, and firing the resulting mixture in air at a temperature within the range of about 1200° C. to about 1300° C. for about one hour to about five hours. The aforesaid rare earth oxide mixture group consisting of $Y_2O_3$ and $Tb_2O_3$ may be produced simply by physically mixing these ingredients, but it should, in general, be prepared by once dissolving these ingredients in a mineral acid with the intention of improving upon the mixcibility thereof, adding an aqueous solution of oxalic acid thereto to coprecipitate yttrium oxalate, lanthanum oxalate and terbium oxalate, and then pyrolyzing the resulting coprecipitated rare earth oxalate mixture. The preferred amount of the activator Tb suitable for the phosphor (6) is within the range of $10^{-2}$ to $1.5\times 10^{-1}$ gram, and more particularly $5\times 10^{-2}$ to $6\times 10^{-2}$ gram, per 1 gram of host material $Y_2O_2S$.

Phosphor (7) may be prepared by adding an appropriate amount of a silver compound such as silver nitrate ($AgNO_3$) or the like to reagent grade zinc sulfide (ZnS) and then firing the resulting mixture in a weak-reducing atmosphere at a temperature within the range of about 900° C. to about 1200° C. for about one hour to about five hours. The resulting [ZnS:Ag] is known to have two crystal systems; i.e., a cubic system and a hexagonal system. The phosphor [ZnS:Ag] crystal of the hexagonal system can be obtained by firing the aforesaid starting material at a temperature higher than about 1020° C., and that of a cubic system can be produced by firing the aforesaid starting material at a temperature lower than about 1020° C. [ZnS:Ag] of either the cubic crystal system or the hexagonal crystal system can be used as the component of the fluorescent composition. The preferred amount of the activator Ag suitable for [ZnS:Ag] was within the range of $10^{-5}$ to $10^{-3}$ gram, and more particularly $5\times 10^{-5}$ to $5\times 10^{-4}$ gram, per gram of host material ZnS.

Phosphor (8) may be prepared by adding the prescribed amount of europium oxide ($Eu_2O_3$) to yttrium oxide ($Y_2O_3$), and then mixing them thoroughly to make a rare earth oxide mixture, further mixing the resulting mixture with 20 to 40 weight % of sulfur (S) and 20 to 40 weight % of sodium carbonate ($Na_2CO_3$) to act as a flux, and then firing them in air at a temperature of about 1200° C. to about 1300° C. for about one hour to about five hours. The preferred amount of the activator Eu suitable for the phosphor (8) was within the range of $10^{-2}$ to $1.5\times 10^{-1}$ gram, and more particularly $5\times 10^{-2}$ to $6\times 10^{-2}$ gram, per gram of host material $Y_2O_2S$.

Phosphor (9) may be prepared by adding the prescribed amount of europium oxide ($Eu_2O_3$) to yttrium oxide ($Y_2O_3$), and then mixing them thoroughly to make a rare earth oxide mixture, further mixing the resulting mixture with 0.01 to 1 weight % of boric compound such as boric acid ($H_3BO_3$), potassium tetraborate ($K_2B_4O_7$), sodium tetraboride ($Na_2B_4O_7$) or the like, to act as a flux, and then firing them in air at a temperature of about 1300° C. to about 1400° C. for about one hour to about five hours. The preferred amount of the activator Eu suitable for the phosphor (9) was within the range of $10^{-2}$ to $1.5 \times 10^{-1}$ gram, and more particularly $5 \times 10^{-2}$ to $6 \times 10^{-2}$ gram, per gram of host material $Y_2O_3$.

Phosphor (10) may be prepared by adding the prescribed amount of europium oxide ($Eu_2O_3$) to yttrium oxide ($Y_2O_3$), and then mixing them thoroughly to make a rare earth oxide mixture further mixing the resulting mixture with the same mole of vanadium pentoxide ($V_2O_5$), and then firing them in air at a temperature of about 1000° C. to about 1100° C. for about one hour to about five hours. The preferred amount of the activator Eu suitable for the phosphor (10) was within the range of $10^{-2}$ to $1.5 \times 10^{-1}$ gram, and more particularly $7 \times 10^{-2}$ to $8 \times 10^{-2}$ gram, per gram of host material $YVO_4$.

In the above process for preparing the phosphors (8), (9) and (10), the rare earth oxide mixture consisting of $Y_2O_2$ and $Eu_2O_3$ may be produced, simply by physically mixing these ingredients, but it should, in general, be prepared by once dissolving these ingredients in nitric acid with the intention of improving upon the miscibility thereof, adding an aqueous solution of oxalic acid thereto to coprecipitate yttrium oxalate, and europium oxalate, and then pyrolyzing the resulting coprecipitated rare earth oxalate mixture.

The above phosphors (1) to (10) emit light of high luminance under high-velocity electron excitation induced by acceleration potentials of several kilo volts, but the luminance of the light emitted under low-velocity electron excitation is very low. Particularly, under the low-velocity electron excitation induced by acceleration potentials below 100 V, the luminance of the phosphors is decreased rapidly to almost zero.

Fluorescent compositions of the present invention can be produced by mechanically mixing $In_2O_3$ and one of the above-described phosphors (1) to (10). The mixing process may be carried out by use of a conventional mixing instrument such as a mortar, a ball-mill, a mixer-mill or the like.

The two components are mixed in a weight ratio of the amount of indium oxide to that of phosphor ranging from 1/9 to 9/1. When indium oxide is present in an amount under the mixing weight ratio of 1/9, characteristics of the resulting composition are akin to those of the phosphor used. Therefore, substantially no emission is observed under low-velocity electron excitation. On the other hand, when indium oxide is present in an amount in excess of the mixing weight ratio of 9/1, the resulting composition gives rise to very weak emission because of the small amount of phosphor. Accordingly, the mixing ratio of these two components is required to be within the range of 1/9 to 9/1. Further, more preferably, the mixing ratio of these components should be within the range of ¼ to 7/3 (by weight).

This fact will now be illustrated hereinbelow with reference to the graphs in FIGS. 3A to 3M. Each of FIGS. 3A to 3M shows the relationship between the $In_2O_3$ phosphor ratio (by weight) of one of fluorescent compositions to be examined in the present invention and the luminance of emission. FIGS. 3A to 3M each corresponds to the luminance of emission achieved under the acceleration potential of 80 V. FIGS. 3A, 3B, 3C, 3D, 3E, 3F, 3G, 3H, 3I, 3J, 3K, 3L and 3M show the results obtained using as phosphors (I) $La_2O_2S:Tb$ (phosphor (1)-1), (II) $(La_{0.5}, Y_{0.5})_2O_2S:Tb$ (phosphor (1)-2), (III) $ZnS:Cu, Al$ (phosphor (2)-1), (IV) $(Zn_{0.95}, Cd_{0.05})S:Cu, Al$ (phosphor (2)-2), (V) $SrGa_2S_4:Eu^{2+}$ (phosphor (3)), (VI) $Y_3Al_5O_{12}:Ce$ (phosphor (4)-1), (VII) $Y_3(Al_{0.6}, Ga_{0.4})_5O_{12}:Ce$ (phosphor (4)-2), (VIII) $Zn_2SiO_4:Mn$ (phosphor (5)), (IX) $Y_2O_2S:Tb$ (phosphor (6)), (X) $ZnS:Ag$ (phosphor (7)), (XI) $Y_2O_2S:Eu$ (phosphor (8)), (XII) $Y_2O_3:Eu$ (phosphor (9)) and (XIII) $YVO_4:Eu$ (phosphor (10)), respectively.

It is apparent from the aforesaid figures that the values of the luminance corresponding to the values of the $In_2O_3$/phosphor ratio smaller than 1/9 and larger than 9/1 were extremely small in all fluorescent compositions. Further, in all fluorescent compositions, the value of the luminance is particularly high when the $In_2O_3$/phosphor ratio is within the range of ¼ to 7/3. As apparent from FIGS. 3K, 3L and 3M, in the red light emitting fluorescent compositions containing one of the phosphors (8) to (10), the fluorescent composition (FIG. 3K) containing the phosphor (8) has the highest luminance, when the $In_2O_3$/phosphor ratio is constant. Although the graph shown in FIG. 3 shows the results obtained when the reagent $In_2O_3$ was used, similar results were obtained when the fired $In_2O_3$ was used. In addition, the fluorescent composition containing a combination of two or more kinds of phosphors selected from the group consisting of the aforesaid phosphors (2) to (6) or (8) to (10) give results similar to the above. Further, it will be understood that fluorescent compositions containing the combined phosphor in the $In_2O_3$/phosphor ratio in the range of 1/9 to 9/1 fall within the scope of the present invention.

The fluorescent compositions of the present invention are characterized by producing emissions having high luminance and excellent color purity under low-velocity electron excitation. Of the fluorescent compositions proposed in the present invention, those compositions containing the phosphors (1) to (6) emit green light, those compositions containing the phosphor (7) emit blue light and those compositions containing the phosphor (8) to (10) emit red light. These results are particularly surprising in view of the fact that the phosphors comprised in the fluorescent compositions of the present invention themselves display emission at high luminance under electron excitation at an acceleration potential of several KV, but display almost no emission under low-velocity electron excitation, particularly under an acceleration potential below 100 V.

Although the reason why compositions prepared from $In_2O_3$ and phosphor of the kind which display hardly any emission under low-velocity electron excitation by mixing them thoroughly can, when mixed thoroughly, display some emission under low-velocity electron excitation has not been clarified at the present, it is thought that the aforesaid phenomena occurs predominantly because of the improved excitation efficiency which becomes possible because the electric conductivity of the composition is raised as a whole by the addition of $In_2O_3$ having higher electric conductivity than the phosphors (1) to (10), so that the charge-up phenomenon does not occur on the occasion of excitation.

Figure 4B:
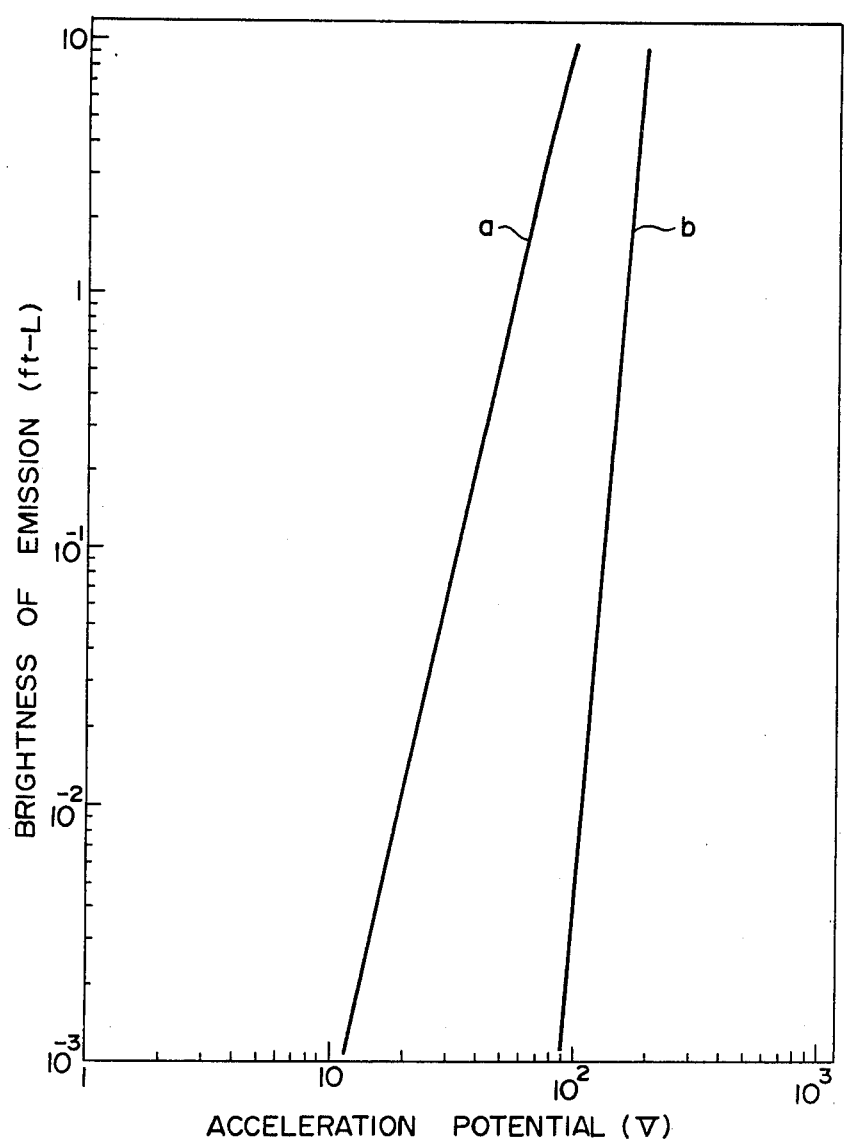
Figure 4C:
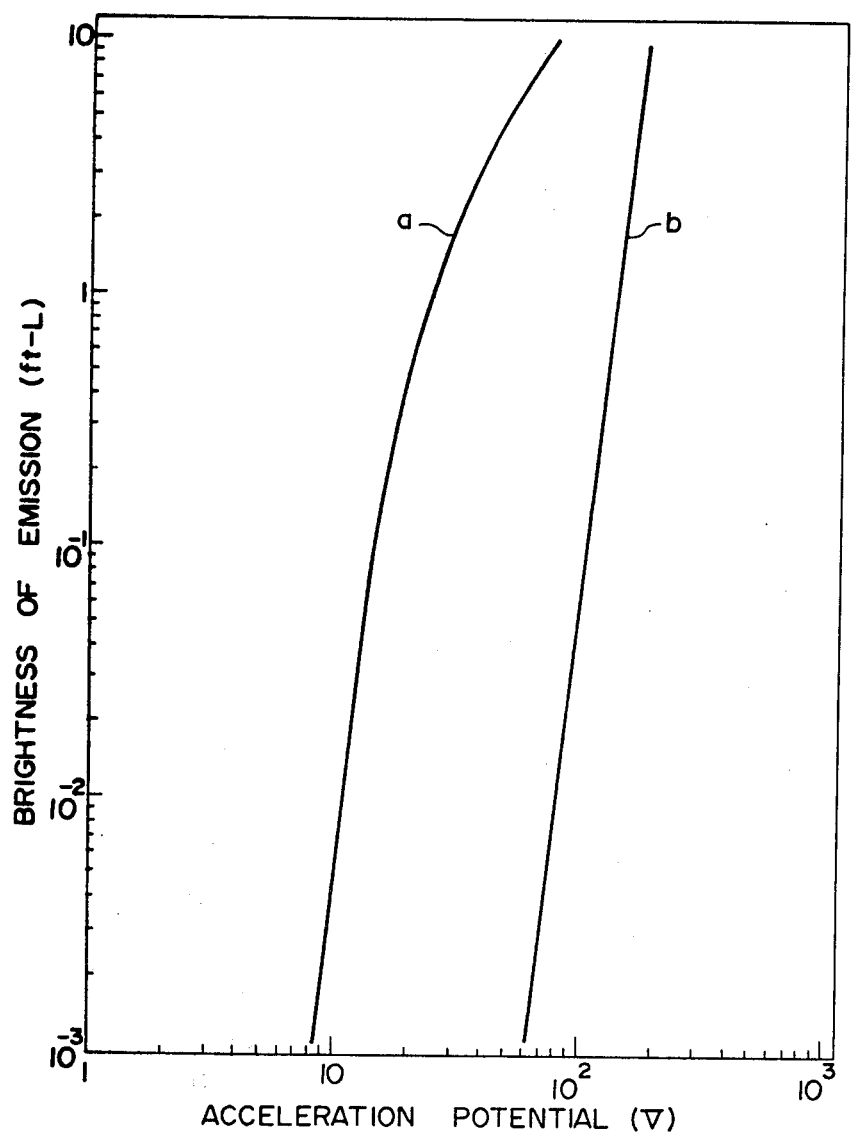
Figure 4D:
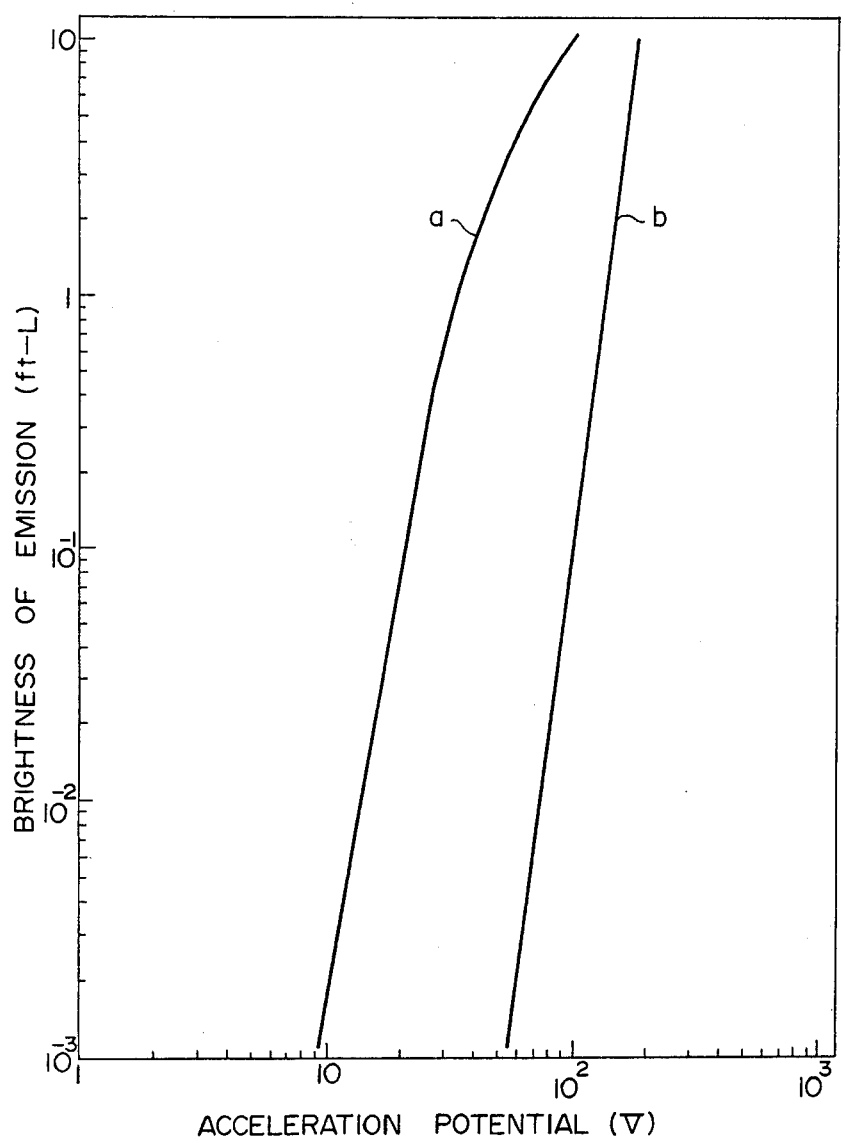
Figure 4G:
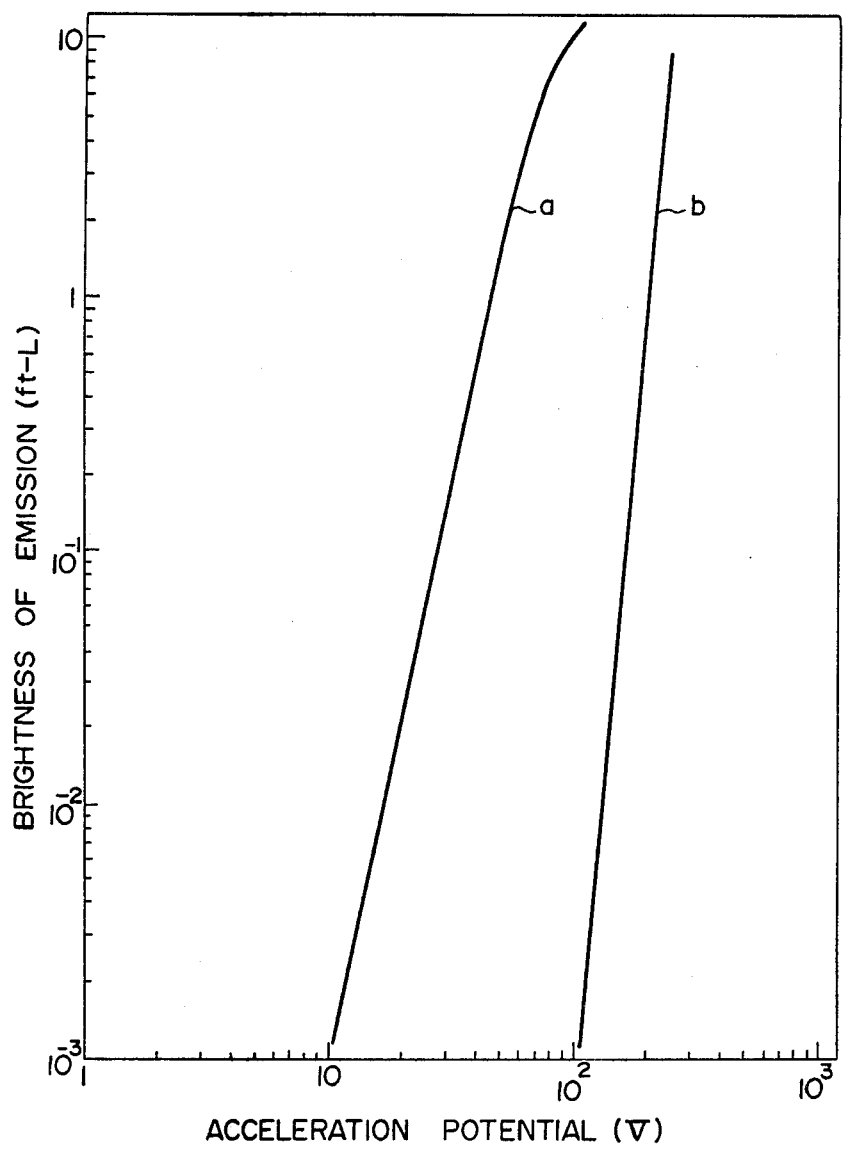
Figure 4H:
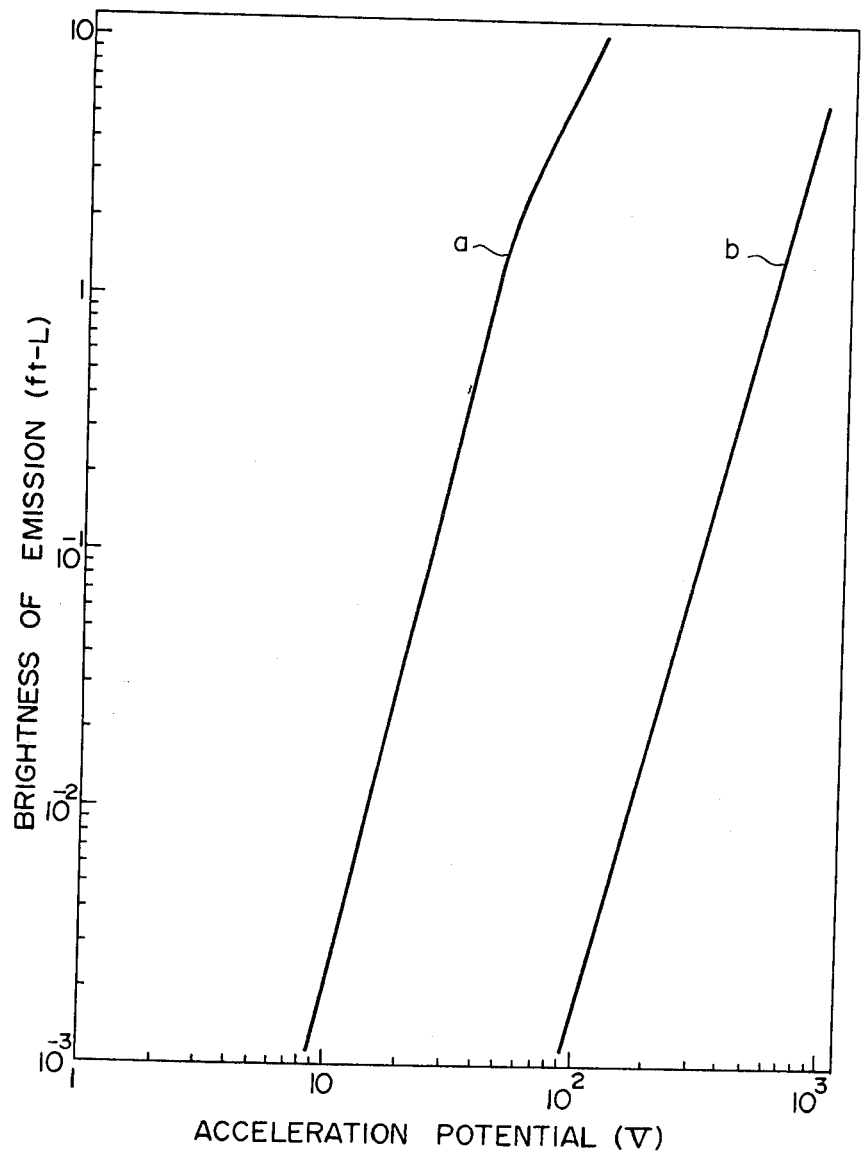
Figure 41:
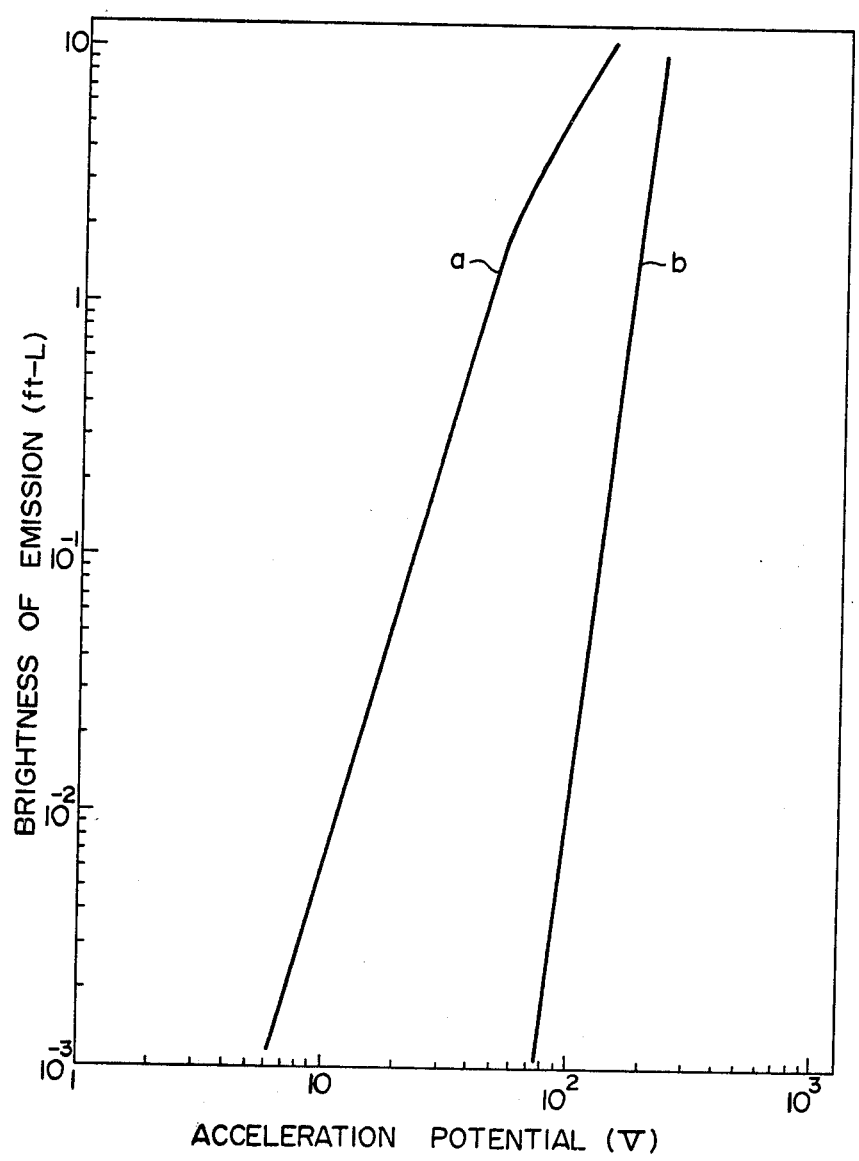
Figure 4J:
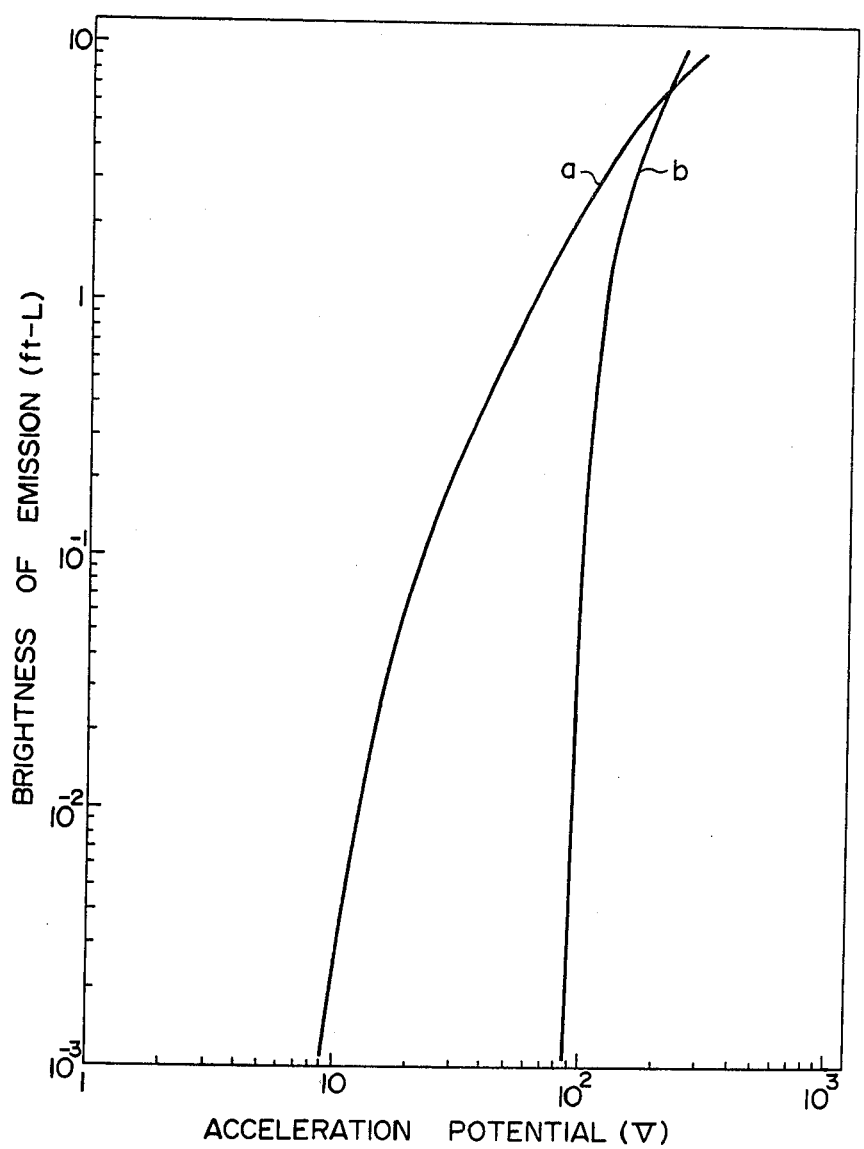
Figure 4K:
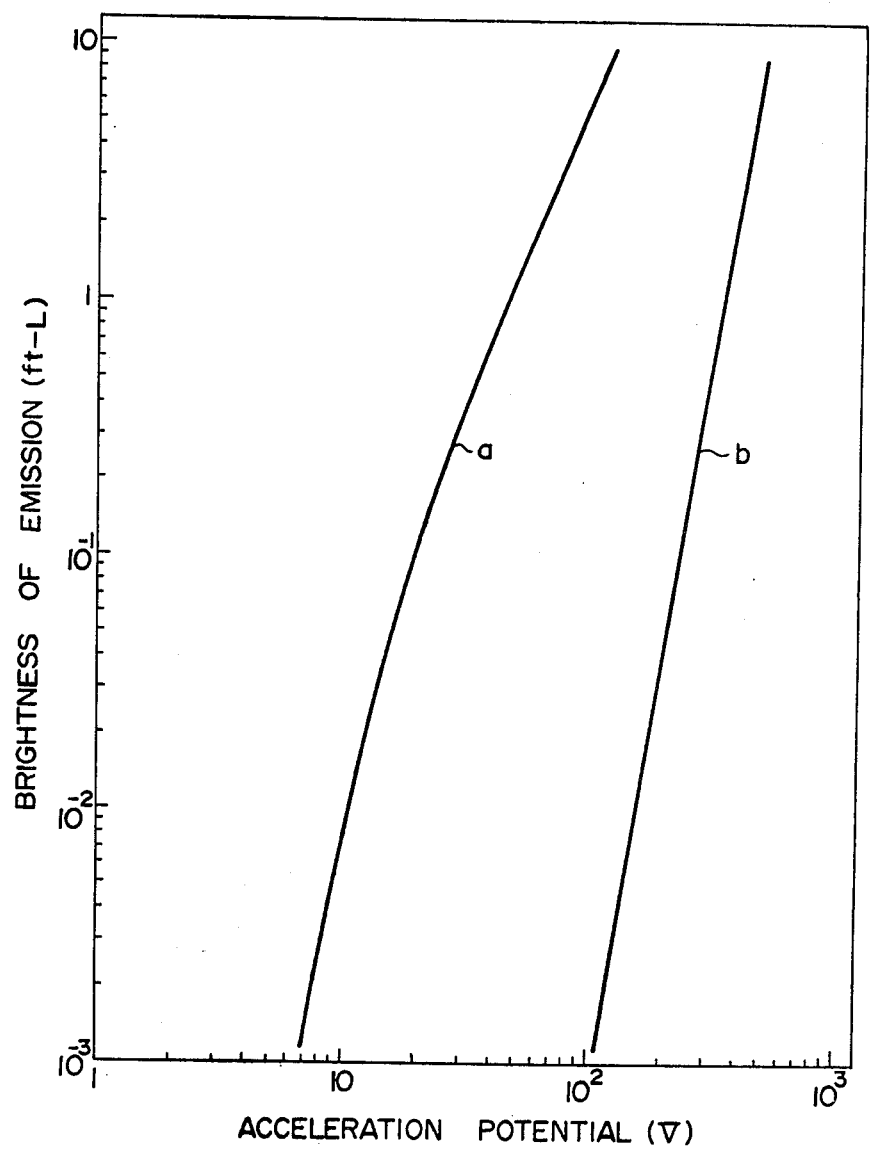
Figure 4L:
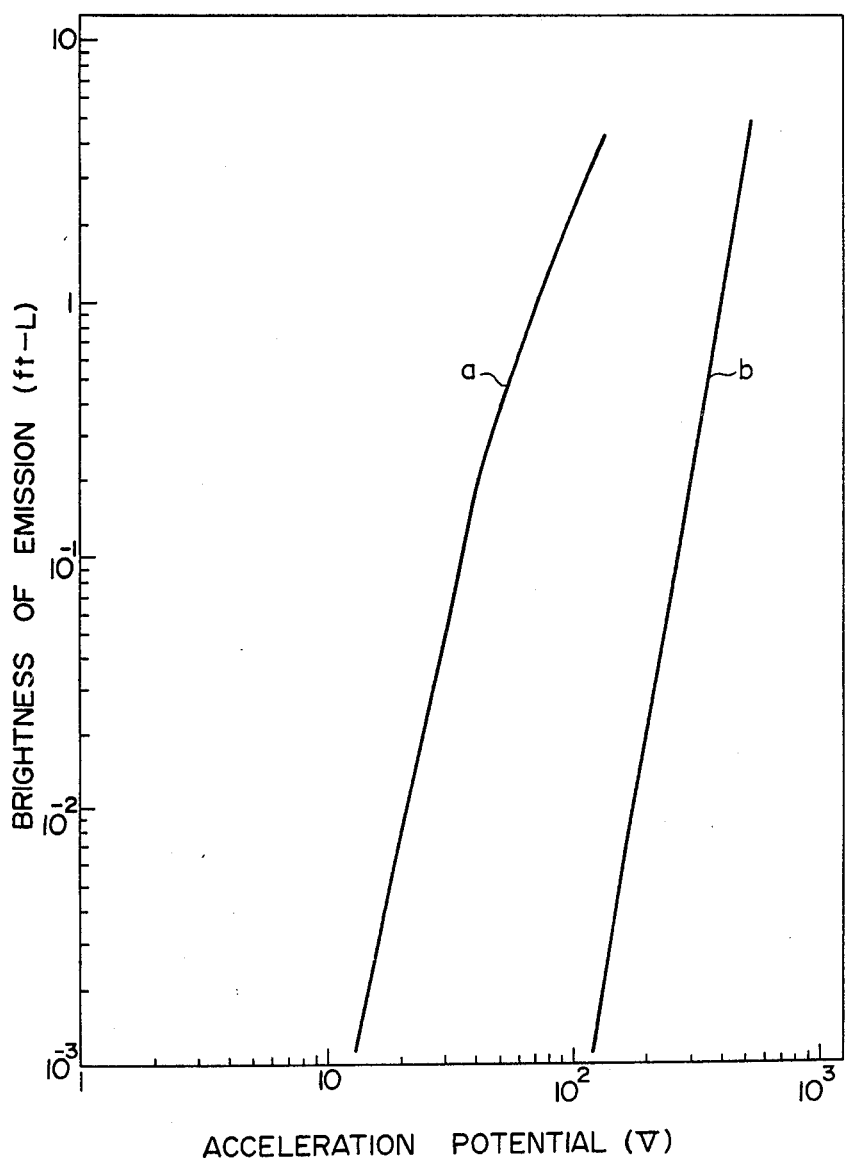
Figure 4M:
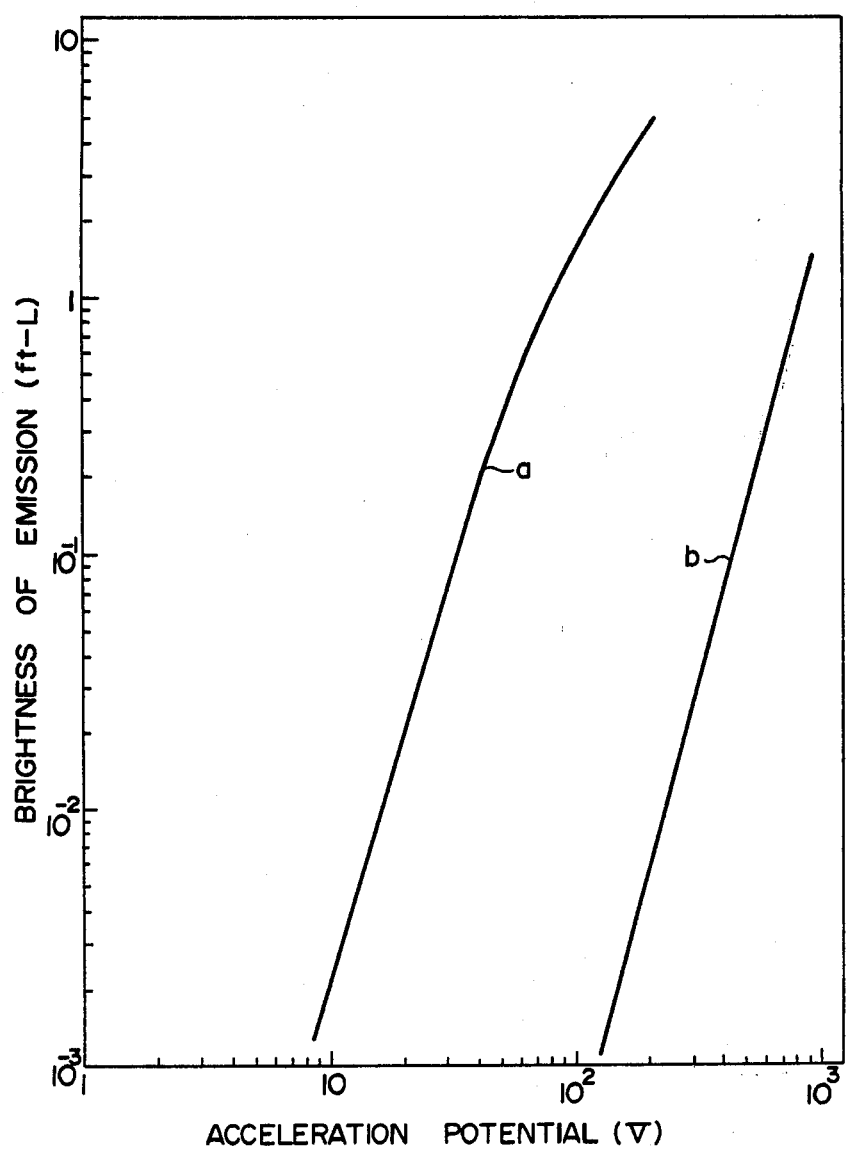

The differences between the emission characteristics of the fluorescent compositions of the present invention and those of phosphors present as a component therein are illustrated in detail with reference to FIGS. 4A to 4M. These figures show the dependence of luminance upon acceleration potential. In each figure, curve-a corresponds to the result for the fluorescent composition prepared in the present invention while curve-b corresponds to that for the phosphor comprised therein itself. That is to say, the curve-a in FIG. 4A shows the result for the fluorescent composition prepared by mixing 3 weight parts of reagent $In_2O_3$ with 7 weight parts of the phosphor (1)-1 [$La_2O_2S:Tb$] which contains an activator Tb in the amount of $5 \times 10^{-2}$ g/g, while the curve-b shows the results for the aforesaid phosphor (1)-1 alone. The curve-a in FIG. 4B shows the results for the fluorescent composition prepared by mixing 3 weight parts of the reagent $In_2O_3$ with 7 weight parts of the phosphor (1)-2 [$(La_{0.5}, Y_{0.5})_2O_2S:Tb$], which contains an activator Tb in the amount of $5 \times 10^{-2}$, while the curve-b shows the results for the aforesaid phosphor (1)-2 alone. The curve-a in FIG. 4C shows the results for the fluorescent composition prepared by mixing reagent $In_2O_3$ with the phosphor (2)-1 [$ZnS:Cu, Al$], which contains both activators Cu and Al in the same amount of $10^{-4}$ g/g, in the amount of an equivalent mixing ratio by weight, while the curve-b shows the results for the aforesaid phosphor (2)-1 alone. The curve-a in FIG. 4D shows the result for the fluorescent composition prepared by mixing reagent $In_2O_3$ with the phosphor (2)-2 [$(Zn_{0.95}, Cd_{0.05})S:Cu, Al$], which contains both activators Cu and Al in the same amount of $10^{-4}$ g/g, in an amount of an equivalent mixing ratio by weight, while the curve-b shows the result for the aforesaid phosphor (2)-2 alone. The curve-a in FIG. 4E shows the result for the fluorescent composition prepared by mixing reagent $In_2O_3$ with the phosphor (3) [$SrGa_2S_4:Eu^{2+}$], which contains the activator $Eu^{2+}$ in the amount of $3 \times 10^{-2}$ gram.atom/mole, in an amount of an equivalent mixing ratio by weight in accordance with another example hereinafter described, while the curve-b shows the result for the aforesaid phosphor (3), alone. The curve-a in FIG. 4F shows the result for the fluorescent composition prepared by mixing reagent $In_2O_3$ with the phosphor (4)-1 [$Y_3Al_5O_{12}:Ce$], which contains the activator Ce in the amount of $10^{-2}$ gram.atom/mole, in an amount of an equivalent mixing ratio by weight in accordance with a further example hereinafter described, while the curve-b shows the result for the aforesaid phosphor (4)-1 alone. The curve-a in FIG. 4G shows the result for the fluorescent composition prepared by mixing reagent $In_2O_3$ with the phosphor (4)-2 [$Y_3(Al_{0.6}, Ga_{0.4})_5O_{12}:Ce$], which contains the activator Ce in the amount of $10^{-2}$ gram.atom/mole, in an amount of an equivalent mixing ratio by weight in accordance with still another example hereinafter described, while the curve-b shows the result for the aforesaid phosphor (4)-2 alone. The curve-a in FIG. 4H shows the result for the fluorescent composition prepared by mixing reagent $In_2O_3$ with the phosphor (5) [$Zn_2SiO_4:Mn$], which contains the activator Mn in the amount of $2 \times 10^{-2}$ gram.atom/mole, in an amount of an equivalent mixing ratio by weight in accordance with another example hereinafter described, while the curve-b shows the result for the aforesaid phosphor (5) alone. The curve-a in FIG. 4I shows the result for the fluorescent composition prepared by mixing reagent $In_2O_3$ with the phosphor (6) [$Y_2O_2S:Tb$], which contains the activator Tb in the amount of $5 \times 10^{-2}$ g/g, in an amount of an equivalent mixing ratio by weight in accordance with a further example hereinafter described, while the curve-b shows the result for the aforesaid phosphor (6) alone. The curve-a in FIG. 4J shows the results for the fluorescent composition prepared by mixing reagent $In_2O_3$ with the phosphor (7) [$ZnS:Ag$], which contains an activator Ag in the amount of $10^{-4}$ g/g, in the amount of an equivalent mixing ratio by weight, while the curve-b shows the results for the aforesaid phosphor (7) alone. The curve-a in FIG. 4K shows the result for the fluorescent composition prepared by mixing reagent $In_2O_3$ with the phosphor (8) [$Y_2O_2S:Eu$], which contains the activator Eu in the amount of $5 \times 10^{-2}$ g/g, in an equivalent mixing ratio by weight in accordance with still another example of the present invention hereinafter described while the curve-b shows the result for the aforesaid phosphor (8) alone. The curve-a in FIG. 4L shows the results for the fluorescent composition prepared by mixing reagent $In_2O_3$ with the phosphor (9) [$Y_2O_3:Eu$], which contains an activator Eu in the amount of $5 \times 10^{-2}$ g/g, in the amount of an equivalent mixing ratio by weight, while the curve-b shows the results for the aforesaid phosphor (9) alone. The curve-a in FIG. 4M shows the results for the fluorescent composition prepared by mixing reagent $In_2O_3$ with the phosphor (10) [$YVO_4:Eu$], which contains an activator Eu in the amount of $7 \times 10^{-2}$ g/g, in the amount of an equivalent mixing ratio by weight, while the curve-b shows the results for the aforesaid phosphor (10) alone.

It is apparent from FIGS. 4A to 4M that the fluorescent compositions of the present invention emit green, blue or red light even under conditions that cause the luminance of the phosphors contained in the respective fluorescent compositions as essential components thereof, to decrease rapidly; i.e., under low-velocity electron excitation induced by acceleration potentials below 100 V. For example, the luminance of each of the fluorescent compositions in accordance with this invention is from about several hundred times to several thousand times as high as that of said respective phosphors alone under low-velocity electron excitation induced by application of acceleration potential of 100 V.

Figure 5C:
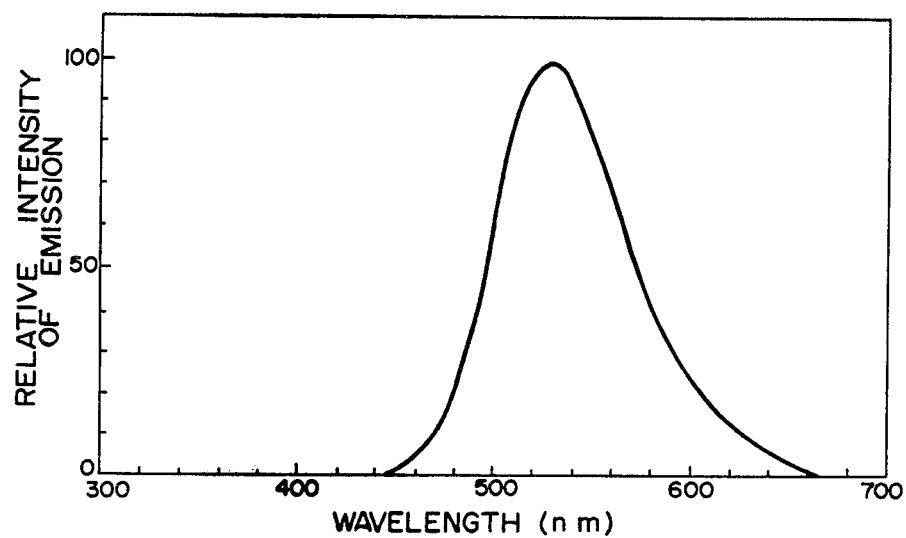
Figure 5D:
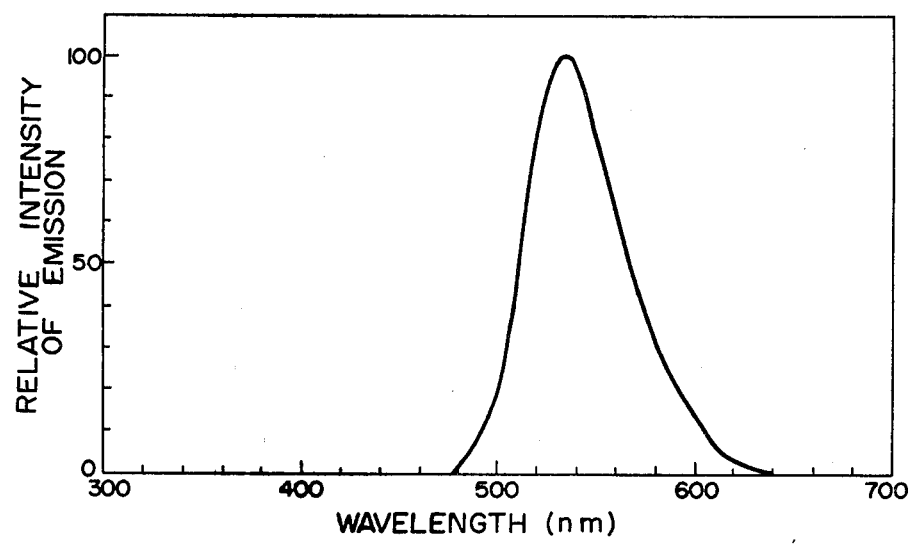
Figure 5E:
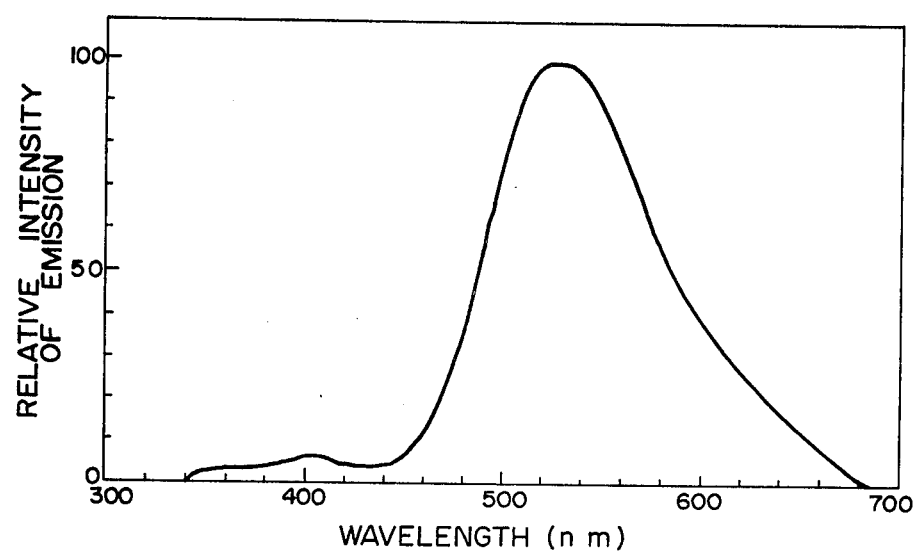
Figure 5F:
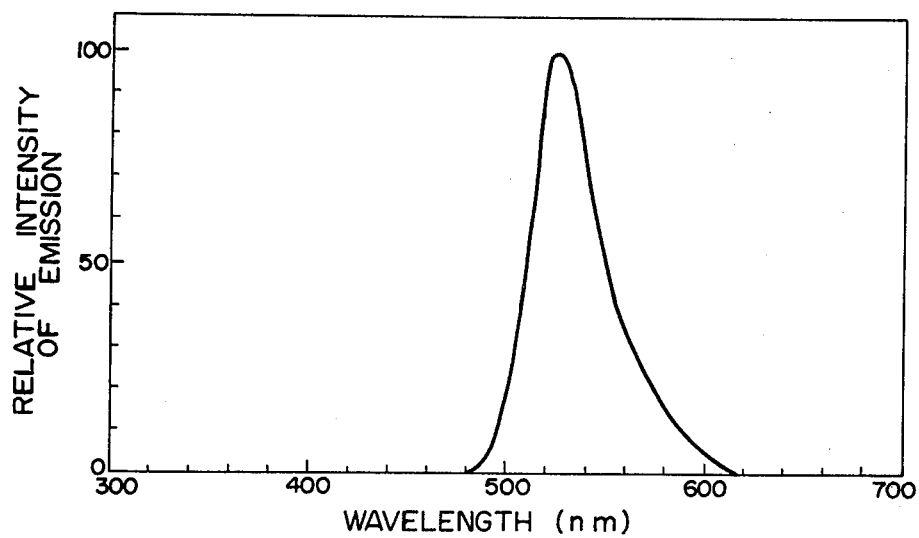
Figure 5G:
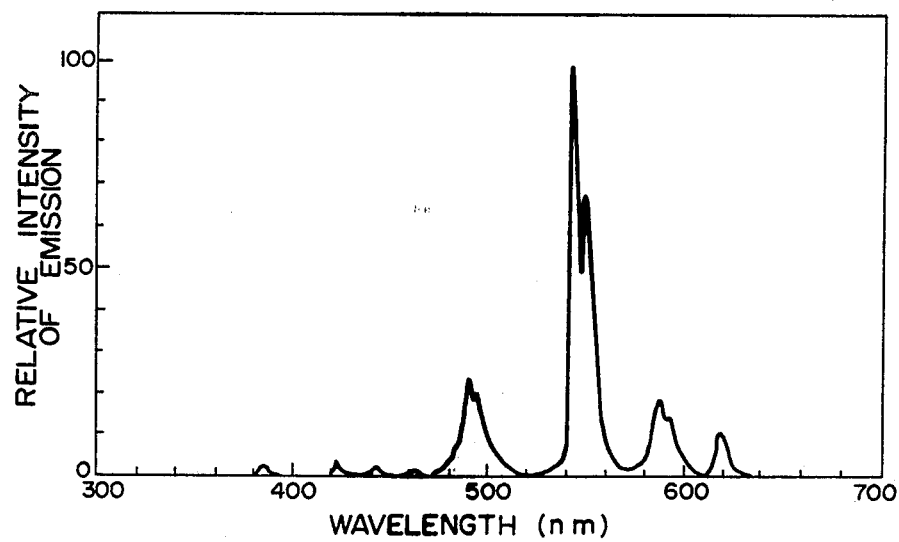
Figure 5H:
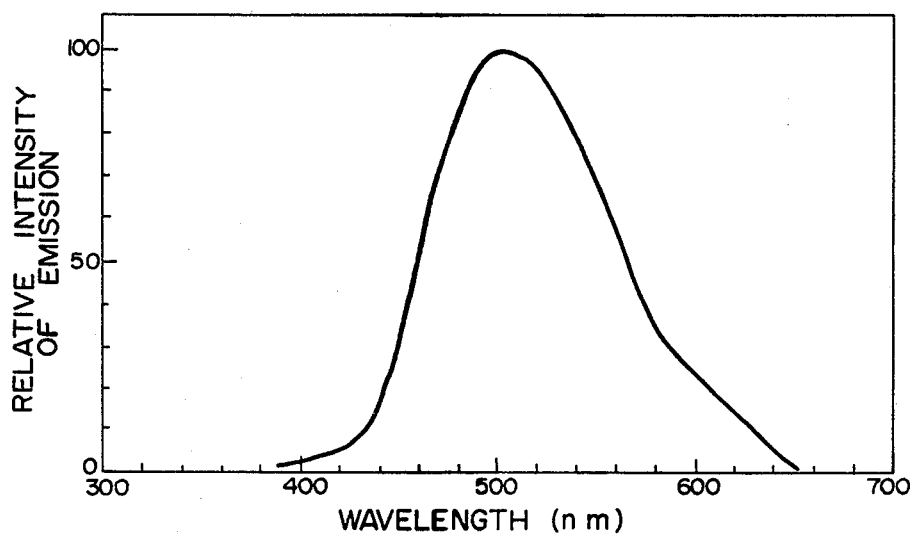

The excellent emission spectrum characteristics of the fluorescent compositions of the present invention will be seen from FIGS. 5A to 5H. Among the fluorescent compositions proposed in the present invention, all green-emitting compositions emit green light in a higher state of color purity than the well-known fluorescent composition [$ZnO:Zn$]. Namely, FIGS. 5A to 5H are graphs representing the emission spectra of fluorescent compositions of the present invention and [$ZnO:Zn$], respectively, under low-velocity electron excitation. FIG. 5A shows the emission spectrum of a fluorescent composition prepared by mixing $In_2O_3$ and the phosphor (1)-1, FIG. 5B shows the emission spectrum of a fluorescent composition prepared by mixing $In_2O_3$ and the phosphor (1)-2, FIG. 5C shows the emission spectrum of a fluorescent composition prepared by mixing $In_2O_3$ and the phosphor (2)-1, FIG. 5D shows the emission spectrum of a fluorescent composition prepared by mixing $In_2O_3$ and the phosphor (3), FIG. 5E shows the emission spectrum of a fluorescent composition prepared by mixing $In_2O_3$ and the phosphor (4), FIG. 5F shows the emission spectrum of a fluorescent composition prepared by mixing $In_2O_3$ and the phosphor (5), FIG. 5G shows the emission spectrum of a fluorescent composition prepared by mixing $In_2O_3$ and the phosphor (6), and FIG. 5H shows the emission spectrum of the conventional fluorescent composition [$ZnO:Zn$] alone.

All of the emission spectra in the aforesaid green emitting compositions of the present invention indicate a main peak at a wavelength closer to green than that of the well-known composition [ZnO:Zn], and the half-value width of each emission spectra is narrower than that of [ZnO:Zn]. Therefore, the emission color of each green emitting composition of the present invention is a green of a higher color purity than the emission color of [ZnO:Zn].

Figure 5I:
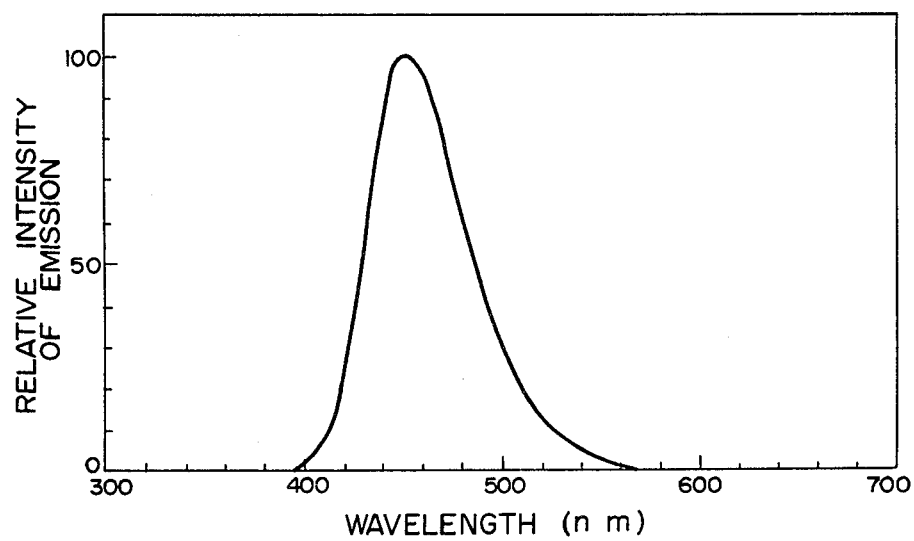
Figure 6:
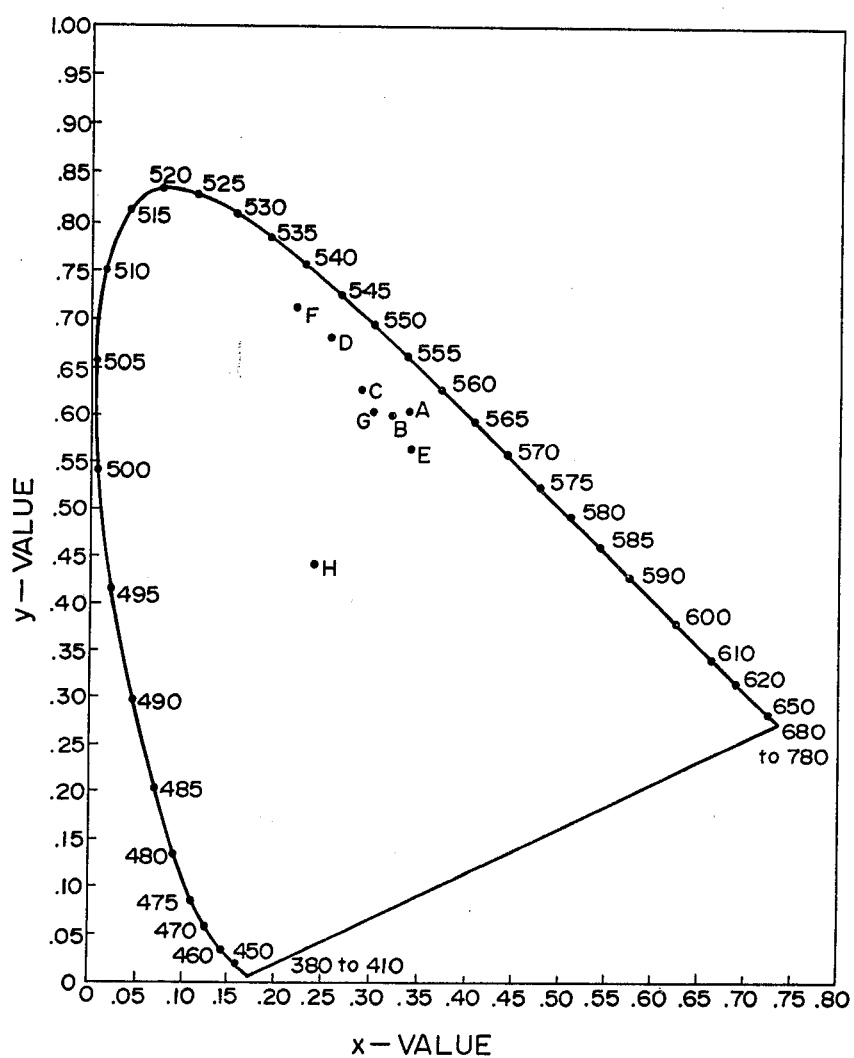
FIG. 6 is a CIE standard chromaticity diagram plotted against the emission chromaticity under low-velocity electron excitation of the fluorescent compositions of the present invention and the known fluorescent composition.

FIG. 6 shows CIE standard chromaticity diagrams wherein chromaticity points of the emission spectra obtained under low-velocity electron excitation relating to the fluorescent compositions illustrated in the examples of the present invention and [ZnO:Zn], the emission spectra of which were shown in FIGS. 5A to 5I, are plotted. The chromaticity points A, B, C, D, E, F, G and H correspond to the emission spectra shown in FIGS. 5A, 5B, 5C, 5D, 5E, 5F, 5G and 5H, respectively. As can be seen from FIG. 6, the emission color obtained for each of the fluorescent compositions of the present invention (chromaticity points A,B,C,D,E,F and G) is also a green of much more excellent color purity than that of [ZnO:Zn] (chromaticity point H). The fluorescent compositions prepared in accordance with the present invention and having emission spectra as shown in FIGS. 5A to 5G each contains a single phosphor. It is, however, possible to produce other fluorescent compositions capable of emitting green light of higher color purity than [ZnO:Zn] by combining two or more phosphors selected from the aforesaid phosphors (1) to (6).

Figure 5J:
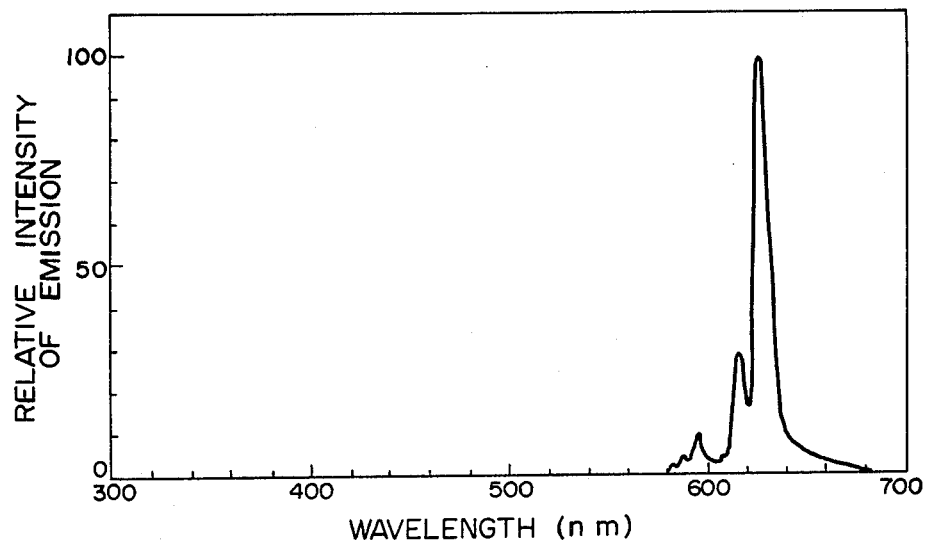
Figure 5K:
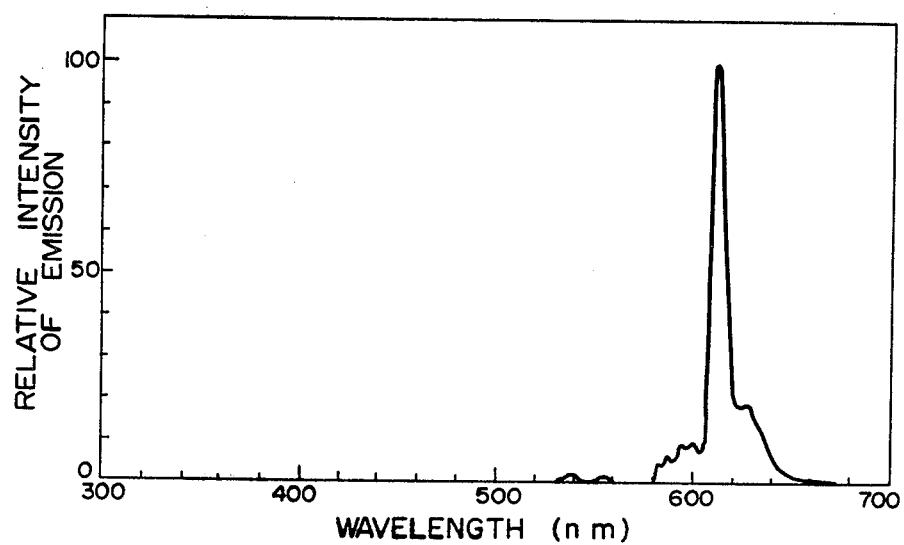
Figure 5L:
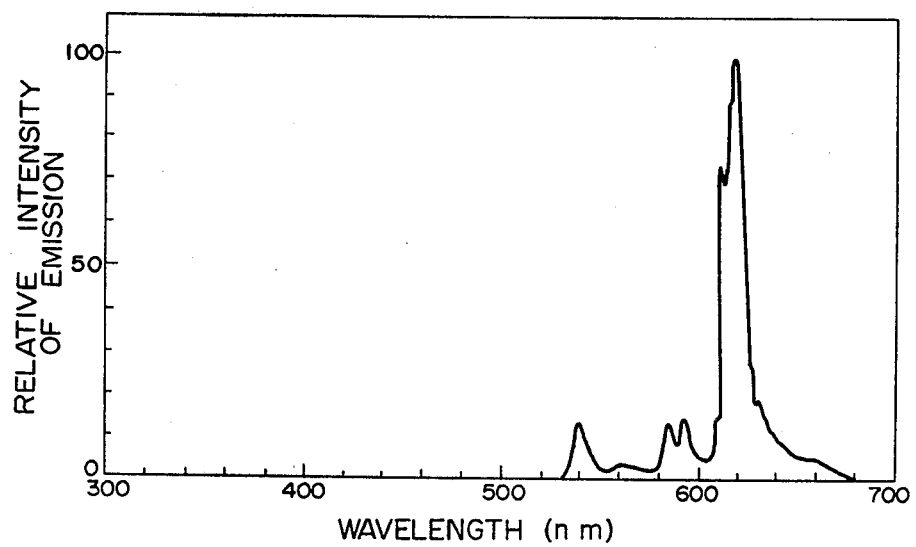

In addition, a fluorescent composition containing the phosphor (7) prepared in accordance with the present invention can give forth blue emission of high luminance in a high state of color purity, and another fluorescent composition containing the phosphor (8) to (10) prepared in accordance with the present invention can give forth red emission of high luminance in a high state of color purity. Almost no fluorescent components of the kind which can emit blue or red light of high luminance and high color purity under low-velocity electron excitation have been known up to now. The emission spectra of the above-described fluorescent compositions of the present invention are shown in FIG. 5I and in FIGS. 5J to 5L, respectively. As clearly shown in FIG. 5I, the emission spectrum of the fluorescent composition containing the phosphor (7) has a peak at about 450-460 nm, and the resulting emission is blue of excellent color purity. On the other hand, as shown in FIGS. 5J to 5L, the emission spectrum of the other fluorescent composition containing the phosphor (8) to (10) has a peak at about 620-630 nm, and the resulting emission is red of excellent color purity. The emission spectra of FIGS. 5J, 5K and 5L are all line spectra in the region of red and the colors (chromatic points) thereof are very close to each other. Therefore, the color of the light emitted by the fluorescent composition containing more than one phosphor among the phosphors (8), (9) and (10) is almost the same as that of the composition containing only one phosphor, the phosphor (8) or (9).

The fluorescent compositions provided by the present invention are very useful as phosphors for making fluorescent display devices, and each can retain its above-mentioned excellent inherent characteristics without impairment when employed as a fluorescent screen enclosed in a fluorescent display tube.

The fluorescent display device provided in accordance with the present invention has essentially the same structure as the known fluorescent display tube described earlier. Namely, its basic structure includes an anodic plate having a fluorescent screen on one side thereof and a cathode standing face to face with the aforesaid fluorescent screen both of which are enclosed in an evacuated tube. The fluorescent display device of the present invention is characterized by the fluorescent composition which forms the fluorescent screen on the anodic plate. Therefore, aside from the fluorescent screen, all elements constituting the fluorescent display device of the present invention can be conventional ones as used in ordinary fluorescent display devices. Moreover, conventional techniques employed for producing conventional fluorescent display devices can be applied to the production of the fluorescent display devices of the present invention without modification. A concrete illustration of a typical method for manufacturing the fluorescent display device according to the present invention is given below.

First an anodic plate supported by a conventional ceramic base plate is coated with the above-described fluorescent composition in accordance with the sedimentation coating method in order to make a fluorescent screen. Namely, an anodic plate is placed in an aqueous suspension of the fluorescent composition and the fluorescent composition is allowed to deposit on one side of the anodic plate as it settles because of its own weight, and then the water is removed from the aqueous suspension. The resulting coated layer is then dried. In such a process, a small amount of water glass (about 0.01 to about 1%) may be added to the aforesaid suspension for the purpose of increasing the adhesive property of the resulting fluorescent screen to the anodic plate. The preferred amount of fluorescent composition applied to the anodic plate is within the range of about 5 mg/cm$^2$ to about 30 mg/cm$^2$.

The above-described sedimentation coating method has been commonly and widely applied in making fluorescent screens. However, the method for making a fluorescent screen in accordance with the present invention is not to be interpreted as being limited to the aforesaid sedimentation coating method.

A cathode made of a wire-heater covered with an oxide such as BaO, SrO, CaO or the like is placed opposite the fluorescent screen on the anodic plate at an interval of about 5 mm, and then the resulting pair of electrodes is set in a transparent container made of glass or the like and air present in the container is evacuated. After the pressure inside this container reaches a pressure of $10^{-5}$ Torr or less, the evacuation is stopped and the container is sealed. After sealing, the pressure inside the resulting container is additionally reduced by sputtering a getter. By the method described, a fluorescent display device capable of attaining the objects of the present invention can be obtained.

Figure 2:
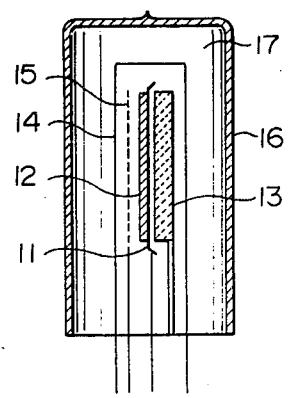
Figure 3A:
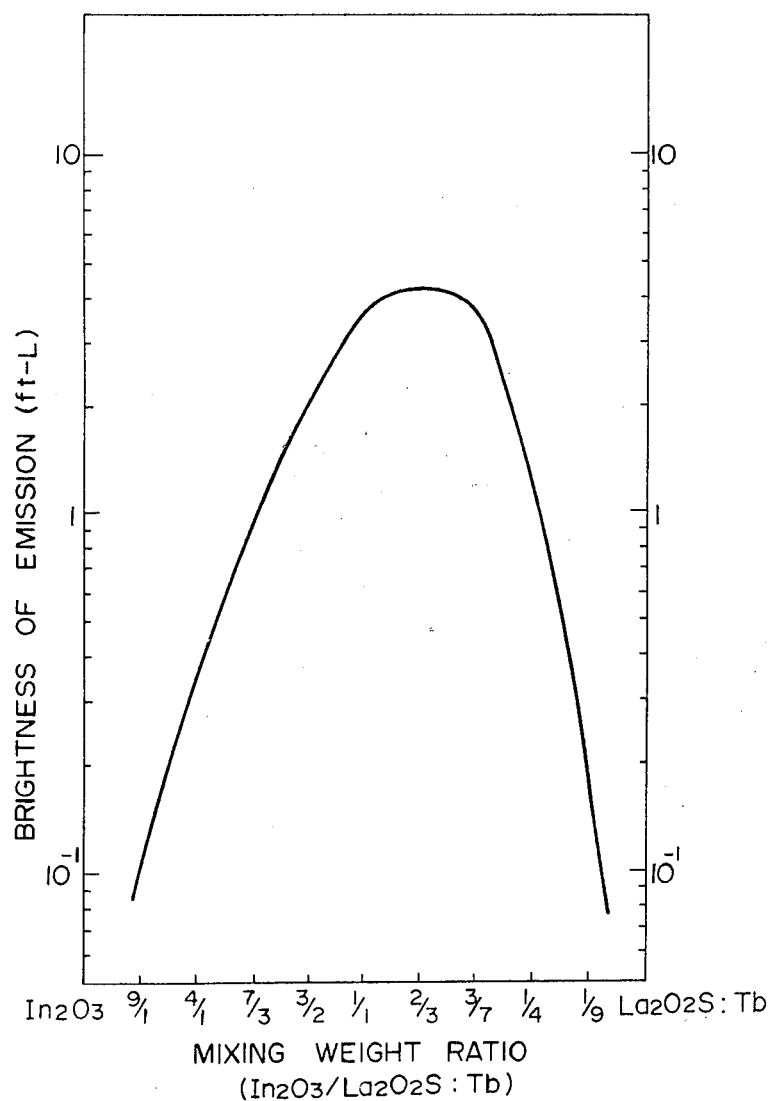
Figure 3B:
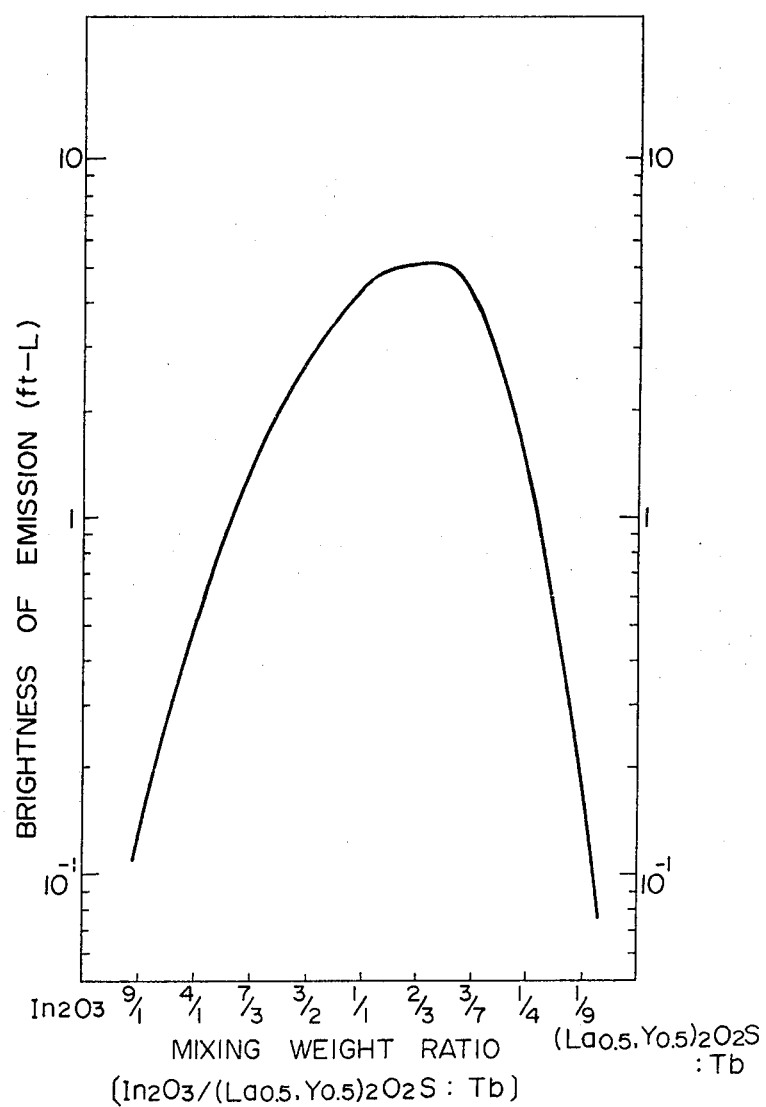
Figure 3C:
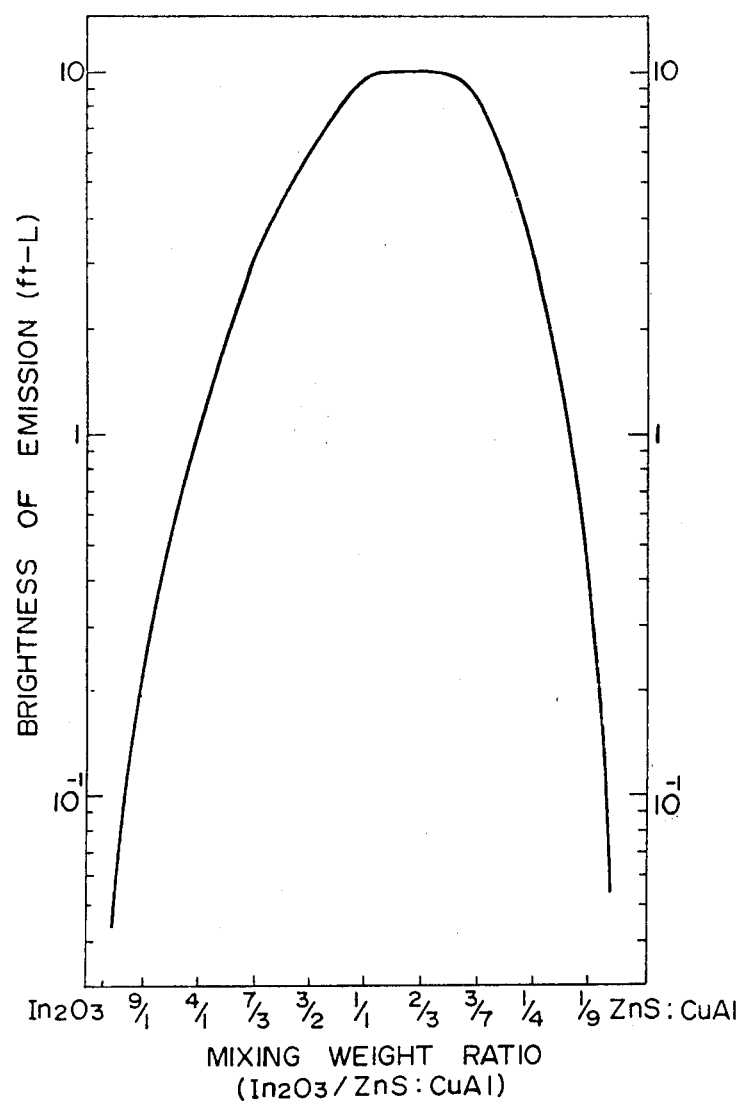
Figure 3E:
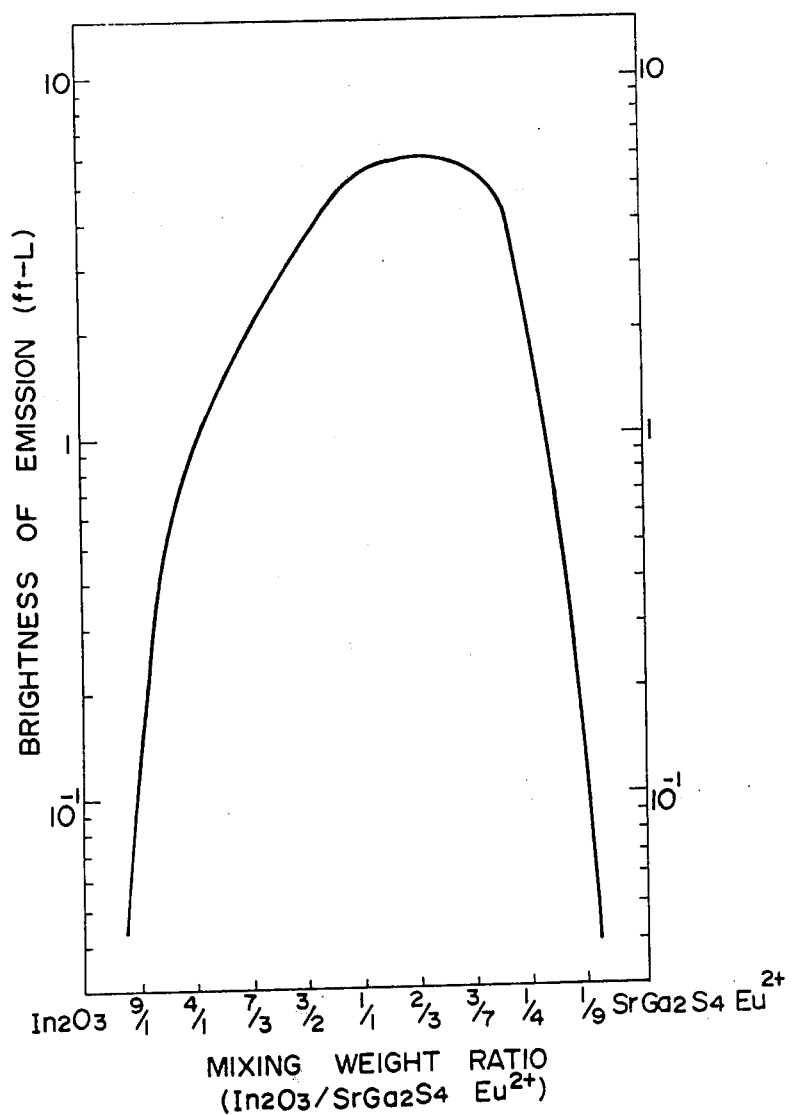
Figure 3F:
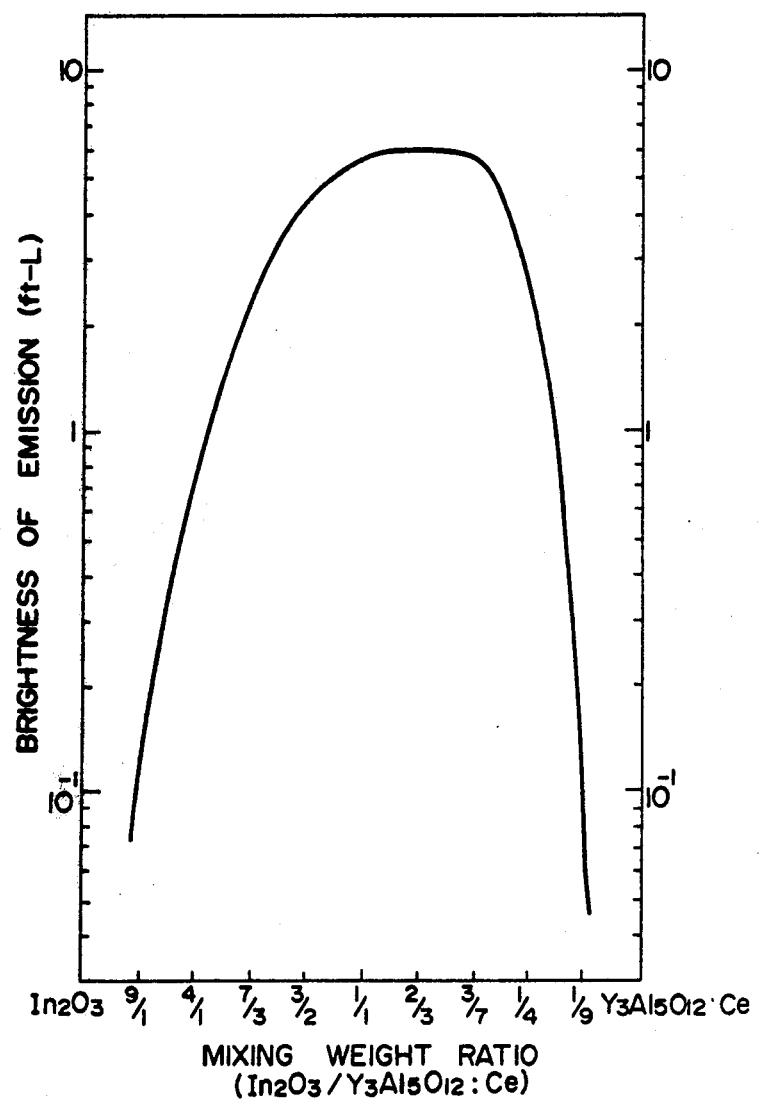
Figure 3G:
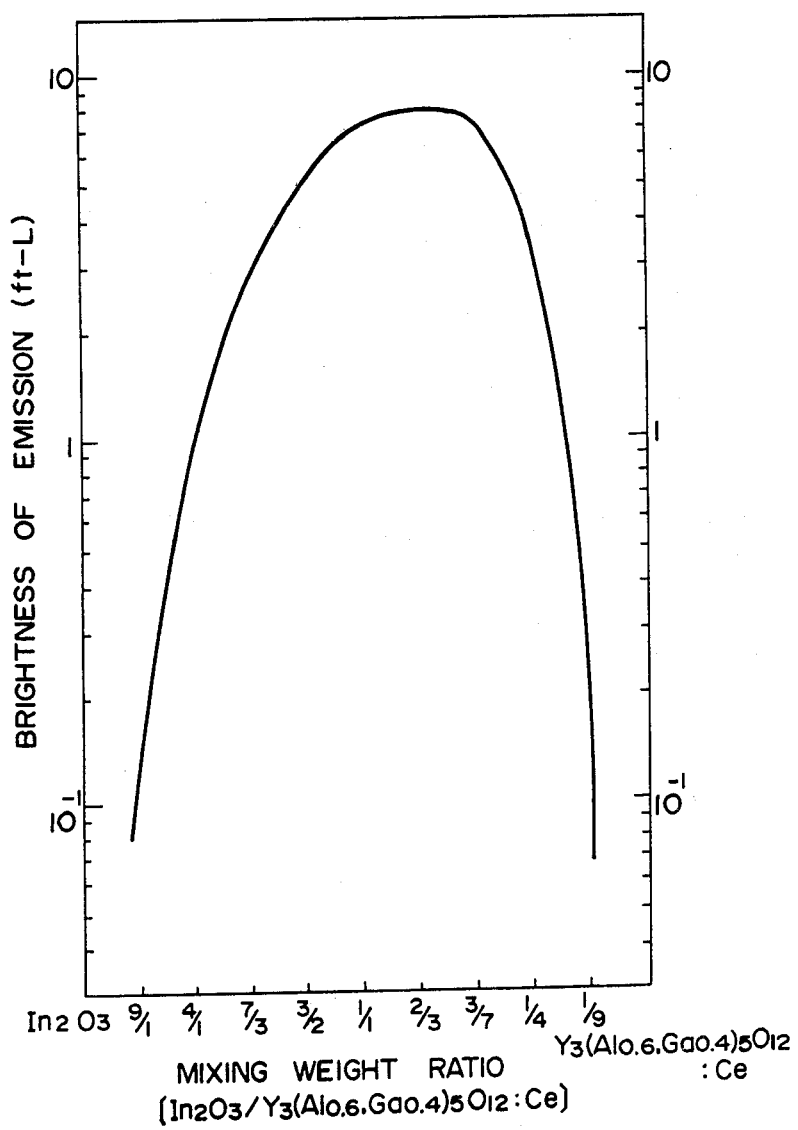
Figure 3H:
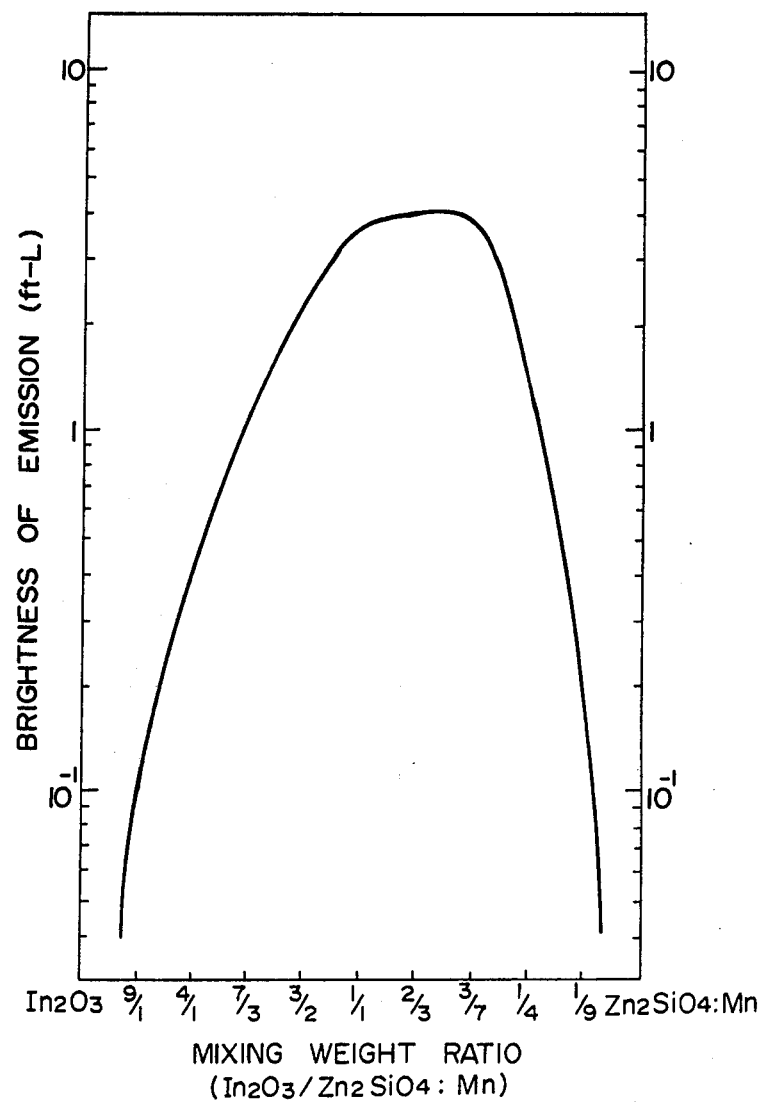
Figure 31:
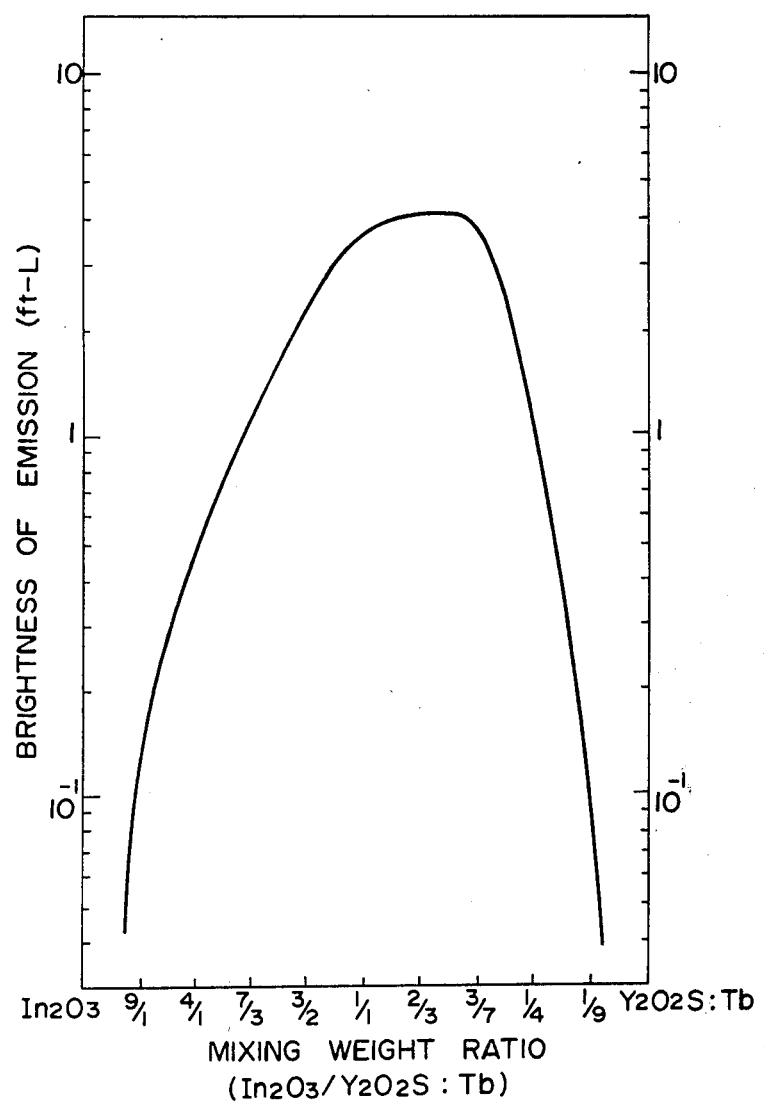
Figure 3J:
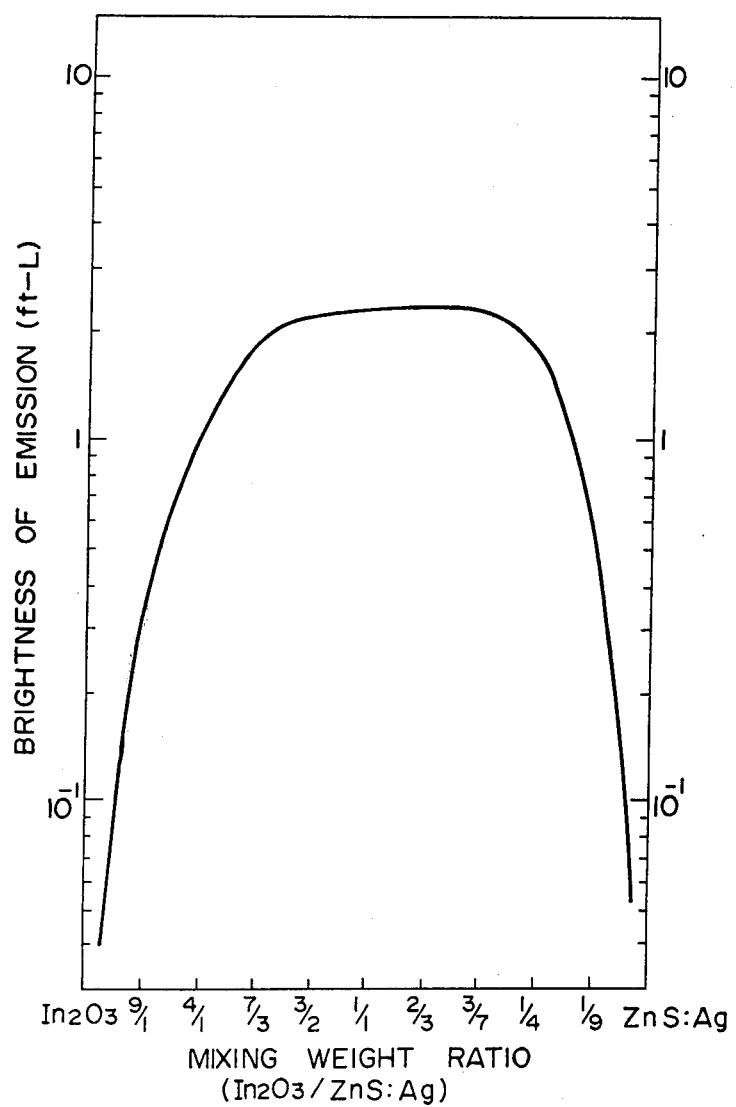
Figure 3K:
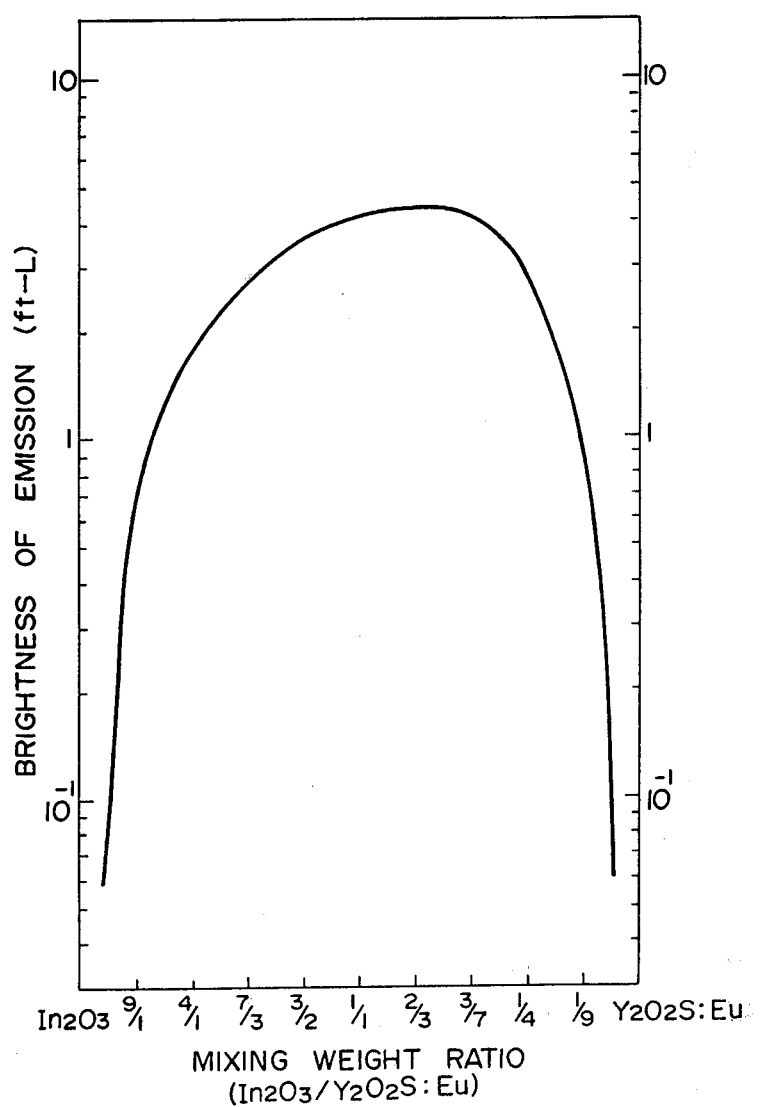
Figure 3L:
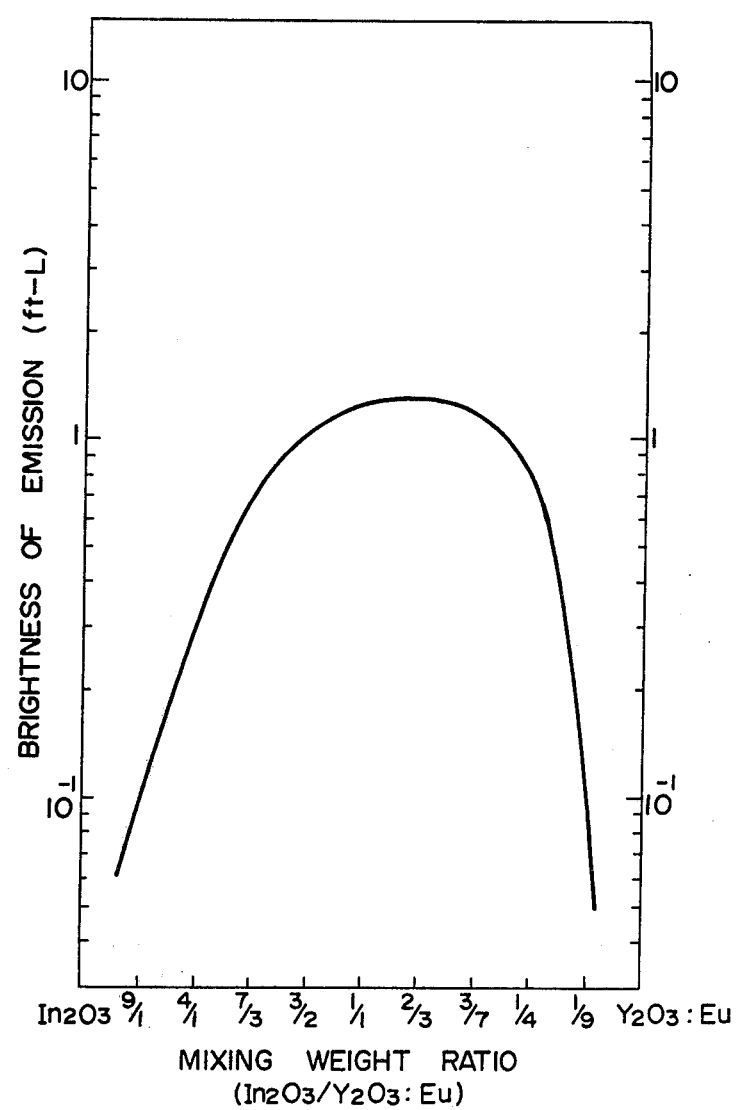
Figure 3M:
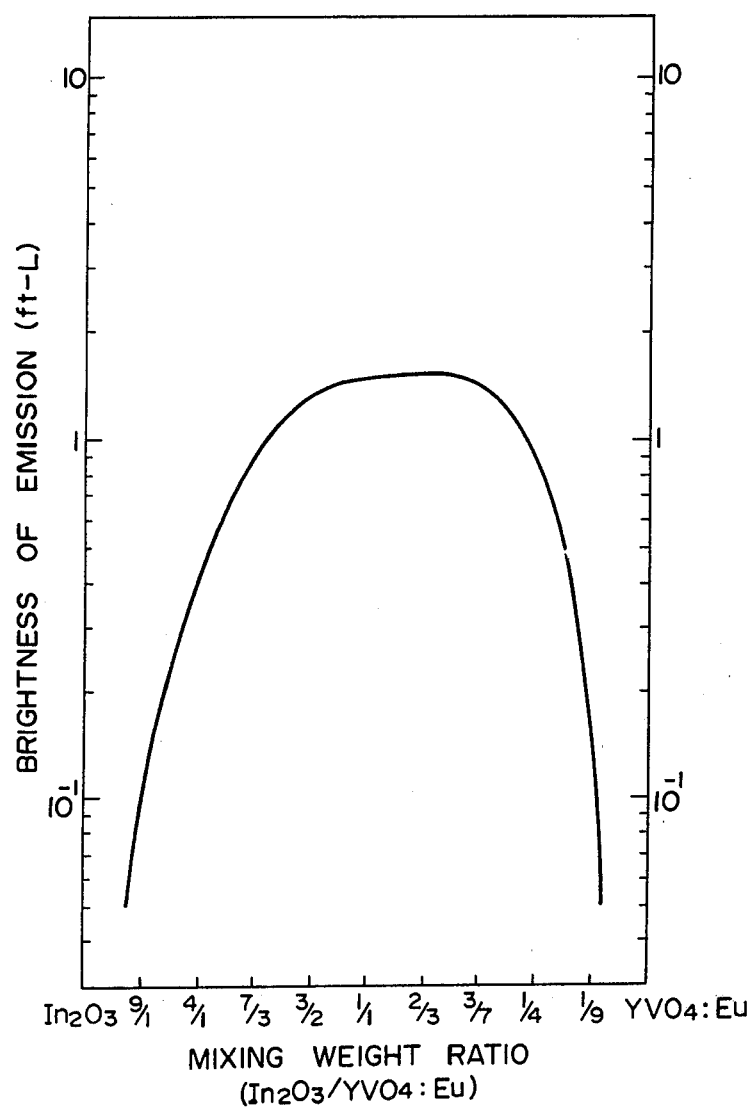

Further, as shown in FIG. 2, it is desirable to place a mesh-like control grid between the cathode and the fluorescent screen to function as a diverging electrode. Such an electrode is useful in diverging low-velocity electrons emitted from the cathode because the fluorescent screen on the anodic plate is flat while the cathode is a wire. In this case, better results are attained by using as fine a mesh as possible since a smaller mesh results in a smaller loss in emission and in better efficiency in the divergence of low-velocity electrons. Specifically, meshes of below 500 micron and having an aperture ratio of not less than 50% are preferred. (Where the aperture ratio refers to the area of the holes capable of passing low-velocity electrons divided by the total area of the grid). A character, number or patterns can be displayed by cutting the anodic plate in the form of the character, number or pattern to be displayed and selectively applying the acceleration potential suitable for the particular pair of separated anodes. Moreover, multicolor fluorescent display devices can be produced by cutting the anodic plate into a desired form; e.g., the form of an array of dots or lines, applying a fluorescent screen which contains a first fluorescent composition consisting of $In_2O_3$ and one phosphor onto some portions of the separated anode, and applying onto other portions of the anode a fluorescent screen comprising other phosphors which, under low-velocity electron excitation, can emit light of a color different from that of said first composition.

In accordance with the present invention, it is possible to provide fluorescent display devices which can display green emission of higher color purity than conventional divices having a fluorescent screen made of [ZnO:Zn] and is further possible to provide divices which can display blue emission or red emission. The present invention has very large utility value from a industrial point of view because almost no blue or red emitting fluorescent display devices have been known up to now. It has further been found in accordance with the present invention that it becomes feasible to produce multicolor low-velocity electron excited fluorescent display devices by using a fluorescent screen consisting of various kinds of fluorescent compositions suitable for low-velocity electron excitation which can display emissions of different colors from one another.

The present invention will now be illustrated in greater detail by reference to the following examples.

EXAMPLE 1

3 weight parts of reagent $In_2O_3$ (manufactured by CERAC Incorporated hereinafter referred to as "type I") and 7 weight parts of $[La_2O_2S:Tb]$ (phosphor (1)-1) containing as an activator Tb in the amount of $5 \times 10^{-2}$ g/g were mixed thoroughly by using a mortar. A fluorescent composition capable of displaying green emission having high luminance and higher color purity than that of [ZnO:Zn] under low-velocity electron excitation was obtained. In the same manner as the above, other fluorescent compositions having different mixing ratios within the range of 1:9 to 9:1 (by weight) were prepared.

EXAMPLE 2

Reagent $In_2O_3$ (type I) was placed in an alumina crucible and fired at 1400° C. for one hour in air. The resulting heat treated $In_2O_3$ was fully ground to a fine powder by means of a ball-mill. 3 weight parts of this heat treated $In_2O_3$ and 7 weight parts of $[(La_{0.9}, Y_{0.1})_2O_2S:Tb]$ (phosphor (1)) containing as an activator Tb in the amount of $5 \times 10^{-2}$ g/g were thoroughly mixed by using a mortar. A fluorescent composition capable of displaying green emission having high luminance and higher color purity than that of [ZnO:Zn] under low-velocity electron excitation was obtained. In the same manner, fluorescent compositions having different mixing ratios within the range of 1:9 to 9:1 (by weight) were prepared.

EXAMPLE 3

Reagent $In_2O_3$ (type I) was placed in an alumina crucible and fired at 1200° C. for one hour in a weak reductive atmosphere consisting of 99% of nitrogen and 1% of hydrogen. The resulting heat treated $In_2O_3$ was fully ground to a fine powder by means of a ball-mill. 3 weight parts of the this heat treated $In_2O_3$ and 7 weight parts of $[(La_{0.5}, Y_{0.5})_2O_2S:Tb]$ (phosphor (1)-2) containing Tb in the amount of $5 \times 10^{-2}$ g/g were thoroughly mixed by using a mortar. The thus obtained fluorescent composition could display green emission having high luminance and higher color purity than that of [ZnO:Zn] under low-velocity electron excitation. In the same manner, fluorescent compositions having different mixing ratios within the range of 1:9 to 9:1 (by weight) were prepared.

EXAMPLE 4

3 weight parts of reagent $In_2O_3$ (type I) and 7 weight parts of $[(La_{0.2}, Y_{0.8})_2O_2S:Tb]$ (phosphor (1)) containing Tb in the amount of $5 \times 10^{-2}$ g/g were thoroughly mixed by using a mortar. Thus, a fluorescent composition capable of displaying green emission having high luminance and high color purity than that of [ZnO:Zn] under low-velocity electron excitation was obtained. In the same manner, fluorescent compositions having different mixing ratios within the range of 1:9 to 9:1 (by weight) were prepared.

EXAMPLE 5

One weight part of reagent $In_2O_3$ (type I) and one weight part of [ZnS:Cu, Al] (phosphor (2)-1) containing as activators Cu and Al in the equivalent amount of $10^{-4}$ g/g were mixed thoroughly by using a mortar. A fluorescent composition capable of displaying green emission having high luminance and higher color purity than that of [ZnO:Zn] under low-velocity electron excitation was obtained. In the same manner as the above, other fluorescent compositions having different mixing ratios within the range of 1:9 to 9:1 (by weight) were prepared.

EXAMPLE 6

Reagent $In_2O_3$ (type I) was placed in an alumina crucible and fired at 1400° C. for one hour in air. The resulting heat treated $In_2O_3$ was fully ground to a fine powder by means of a ball-mill. 1 weight part of this heat treated $In_2O_3$ and 1 weight part of $[(Zn_{0.95}, Cd_{0.05})S:Cu, Al]$ (phosphor (2)-2) containing as activators both Cu and Al in the equivalent amount of $10^{-4}$ g/g were thoroughly mixed by using a mortar. A fluorescent composition capable of displaying green emission having high luminance and higher color purity than that of [ZnO:Zn] under low-velocity electron excitation was obtained. In the same manner, fluorescent compositions having different mixing ratios within the range of 1:9 to 9:1 (by weight) were prepared.

EXAMPLE 7

Reagent $In_2O_3$ (manufactured by Hikotaro Shudzui Co., Ltd. hereinafter referred to as "type II") and $[SrGa_2S_4:Eu^{2+}]$ (phosphor (3)) containing $Eu^{2+}$ in the activating amount of $3 \times 10^{-2}$ gram.atom/mole were well-mixed in equivalent weight parts by using a mortar. Thus, a fluorescent composition capable of displaying green emission having high luminance and higher color purity than that of [ZnO:Zn] under low-velocity electron excitation was obtained. In the same manner as the above, other fluorescent compositions having different mixing ratios within the range of 1:9 to 9:1 (by weight) were prepared.

EXAMPLE 8

Reagent $In_2O_3$ (type II) was placed in an alumina crucible and fired at 1200° C. for one hour in weak reducing atmosphere consisting of 98% of nitrogen and 2% of hydrogen. The resulting heat treated $In_2O_3$ was fully ground to a fine powder by means of a ball-mill. One weight part of the this heat treated $In_2O_3$ and one weight part of $[Y_3Al_5O_{12}:Ce]$ (phosphor (4)-2) containing Ce in the activating amount of $10^{-2}$ gram.atom/mole were well-mixed by using a mortar. The fluorescent composition thus obtained could display green emission having high luminance and higher color purity than that of [ZnO:Zn] under low-velocity electron excitation. In the same manner, fluorescent compositions having different mixing ratios within the range of 1:9 to 9:1 (by weight) were prepared.

EXAMPLE 9

One weight part of reagent $In_2O_3$ (type I) and one weight part of $[Y_3(Al_{0.6}, Ga_{0.4})_5O_{12}:Ce]$ (phosphor (4)-1) containing Ce in the activating amount of $10^{-2}$ gram.atom/mole were thoroughly mixed by using a mortar. Thus, a fluorescent composition capable of displaying green emission having high luminance and higher color purity than that of [ZnO:Zn] under low-velocity electron excitation was obtained. In the same manner, fluorescent compositions having different mixing ratios within the range of 1:9 to 9:1 (by weight) were prepared.

EXAMPLE 10

Reagent $In_2O_3$ (type I) was placed in an alumina crucible and fired at 1200° C. for one hour in air. The resulting heat treated $In_2O_3$ was well-ground to a fine powder by means of a ball-mill. One weight part of the thus obtained heat treated $In_2O_3$ and one weight part of $[Zn_2SiO_4:Mn]$ (phosphor (5)) containing manganese in the activating amount of $2 \times 10^{-2}$ gram.atom/mole were fully mixed by using a mortar. Thus, a fluorescent composition capable of displaying green emission having high luminance and higher color purity than that of [ZnO:Zn] under low-velocity electron excitation was obtained. In a similar manner, fluorescent compositions having different mixing ratios within the range of 1:9 to 9:1 (by weight) were prepared.

EXAMPLE 11

One weight part of reagent $In_2O_3$ (type II) and one weight part of $[Y_2O_2S:Tb]$ (phosphor (6)) containing Tb in the activating amount of $5 \times 10^{-2}$ g/g were thoroughly mixed by using a mortar. Thus, a fluorescent composition capable of displaying green emission having high luminance and higher color purity than that of [ZnO:Zn] under low-velocity electron excitation was obtained. In a similar manner, fluorescent compositions having different mixing ratios within the range of 1:9 to 9:1 (by weight) were prepared.

EXAMPLE 12

Two weight parts of reagent $In_2O_3$ (type I), one weight part of $[Zn_2SiO_4:Mn]$ (phosphor (5)) containing as an activator Mn in the amount of $2 \times 10^{-2}$ gram.atom/mole and one weight part of $[SrGa_2S_4:Eu^{2+}]$ (phosphor (3)) containing $Eu^{2+}$ in the activation amount of $3 \times 10^{-2}$ gram.atom/mole were fully mixed by using a mortar. Thus, a fluorescent composition capable of displaying green emission having high luminance and higher color purity than that of [ZnO:Zn] under low-velocity electron excitation was obtained. In a similar manner, fluorescent compositions differing from one another in composition were prepared by changing the weight ratio of the amount of reagent $In_2O_3$ to the total amount of the combined phosphors (3) and (5) within the range of 1:9 to 9:1.

EXAMPLE 13

Indium sulfate $[In_2(SO_4)_3.9H_2O]$ was placed in an alumina crucible and fired at 1000° C. for one hour in air. The resulting heat treated $In_2O_3$ was well-ground to a fine powder by means of a ball-mill. Two weight parts of the thus obtained heat treated $In_2O_3$, one weight part of [ZnS:Cu, Al] (phosphor (2)-1) containing as activators both Cu and Al in the equivalent amount of $10^{-4}$ g/g and one weight part of $[Zn_2SiO_4:Mn]$ (phosphor (5)) containing as an activator Mn in the amount of $2 \times 10^{-2}$ gram.atom/mole were fully mixed by using a mortar. Thus, a fluorescent composition capable of displaying green emission having high luminance and higher color purity than that of [ZnO:Zn] under low-velocity electron excitation was obtained. In a similar manner, fluorescent compositions differing from one another in composition were prepared by changing the weight ratio of the amount of the heat treated $In_2O_3$ to the total amount of the combined phosphors (2) and (5) within the range of 1:9 to 9:1.

EXAMPLE 14

One weight part of reagent $In_2O_3$ (type I) and one weight part of [ZnS:Ag] (phosphor (7)) containing Ag in the activating amount of $10^{-4}$ g/g were well-mixed by using a mortar. Thus, a fluorescent composition capable of displaying blue emission having high luminance and higher color purity was obtained. In the same manner as the above, other fluorescent compositions having different mixing ratios within the range of 1:9 to 9:1 (by weight) were prepared.

EXAMPLE 15

Reagent $In_2O_3$ (type II) was placed in an alumina crucible and fired at 1400° C. for one hour in air. The resulting heat treated $In_2O_3$ was well-ground to a fine powder by means of a ball-mill. One weight part of the thus obtained heat treated $In_2O_3$ and one weight part of [ZnS:Ag] containing Ag in the activating amount of $10^{-4}$ g/g were fully mixed by using a mortar. The thus obtained blue emitting fluorescent composition had high luminance and high color purity under low-velocity electron excitation. In the same manner as the above, other fluorescent compositions having different mixing ratios within the range of 1:9 to 9:1 (by weight) were prepared.

EXAMPLE 16

Reagent $In_2O_3$ (type I) was placed in an alumina crucible and fired at 1200° C. for one hour in a weak reducing atmosphere consisting of 98% of nitrogen and 2% of hydrogen. The resulting heat treated $In_2O_3$ was well-ground to a fine powder by means of a ball-mill. 3 weight parts of this heat treated $In_2O_3$ and 7 weight parts of [ZnS:Ag] containing Ag in the activating amount of $10^{-4}$ g/g were fully mixed by using a mortar. Thus, a fluorescent composition capable of emitting blue light having high luminance and high color purity under low-velocity electron excitation could be obtained. In the same manner as the above, other fluorescent compositions having different mixing ratios within the range of 1:9 to 9:1 (by weight) were prepared.

EXAMPLE 17

Indium sulfate [$In_2(SO_4)_3.9H_2O$] was placed in an alumina crucible and fired at 1000° C. for one hour in air. The resulting heat treated $In_2O_3$ was well-ground to a fine powder by means of a ball-mill. One weight part of this heat treated $In_2O_3$ and one weight part of [ZnS:Ag] containing Ag in the activating amount of $10^{-4}$ g/g were thoroughly mixed by using a mortar. Thus, a fluorescent composition capable of displaying blue emission having high luminance and high color purity under low-velocity electron excitation was obtained. In the same manner as the above, other fluorescent compositions having different mixing ratios within the range of 1:9 to 9:1 (by weight) were prepared.

EXAMPLE 18

One weight part of reagent $In_2O_3$ (type I) and one weight part of [$Y_2O_2S:Eu$] (phosphor (8)) containing europium in the activating amount of $5 \times 10^{-2}$ g/g were well-mixed by using a mortar. Thus, a fluorescent composition capable of displaying red emission having high luminance and high color purity under low-velocity electron excitation was obtained. In the same manner as the above, other fluorescent compositions having different mixing ratios within the range of 1:9 to 9:1 (by weight) were prepared.

EXAMPLE 19

Reagent $In_2O_3$ (type II) was placed in an alumina crucible and fired at 1400° C. for one hour in air. The resulting heat treated $In_2O_3$ was well-ground to a fine powder by means of a ball-mill. 3 weight parts of this heat treated $In_2O_3$ and 7 weight parts of [$Y_2O_2S:Eu$] containing Eu in the activating amount of $5 \times 10^{-2}$ g/g were fully mixed. Thus, a fluorescent composition capable of displaying red emission having high luminance and high color purity under low-velocity electron excitation was obtained. In the same manner as the above, other fluorescent compositions having different mixing ratios within the range of 1:9 to 9:1 (by weight) were prepared.

EXAMPLE 20

Indium sulfate [$In_2(SO_4)_3.9H_2O$] was placed in an alumina crucible and fired at 1000° C. for one hour in air. The resulting heat treated $In_2O_3$ was well-ground to a fine powder by means of a ball-mill. One weight part of the this heat treated $In_2O_3$ and one weight part of [$Y_2O_2S:Eu$] containing europium in the activating amount of $5 \times 10^{-2}$ g/g were fully mixed by using a mortar. Thus, a fluorescent composition capable of displaying red emission having high luminance and high color purity under low-velocity electron excitation could be obtained. In the same manner as the above, other fluorescent compositions having different mixing ratios within the range of 1:9 to 9:1 (by weight) were prepared.

EXAMPLE 21

One weight part of reagent $In_2O_3$ (type II) and one weight part of [$Y_2O_3:Eu$] (phosphor (9)) containing as an activator Eu in the amount of $5 \times 10^{-2}$ g/g were mixed thoroughly by using a mortar. A fluorescent composition capable of displaying red emission having high luminance and higher color purity than that of [ZnO:Zn] under low-velocity electron excitation was obtained. In the same manner as the above, other fluorescent compositions having different mixing ratios within the range of 1:9 to 9:1 (by weight) were prepared.

EXAMPLE 22

Reagent $In_2O_3$ (type I) was placed in an alumina crucible and fired at 1200° C. for one hour in a weak reducing atmosphere consisting of 98% of nitrogen and 2% of hydrogen. The resulting heat treated $In_2O_3$ was well-ground to a fine powder by means of a ball-mill. 3 weight parts of the thus obtained heat treated $In_2O_3$ and 7 weight parts of [$YVO_4:Eu$] (phosphor (10)) containing Eu in the activating amount of $7 \times 10^{-2}$ g/g were fully mixed by using a mortar. Thus, a fluorescent composition capable of displaying red emission having high luminance and high color purity under low-velocity electron excitation could be obtained. In the same manner as the above, other fluorescent compositions having different mixing ratios within the range of 1:9 to 9:1 (by weight) were prepared.

EXAMPLE 23

2 weight parts of reagent $In_2O_3$ (type I) and one weight part of [$Y_2O_2S:Eu$] (phosphor (8)) containing as an activator Eu in the amount of $5 \times 10^{-2}$ g/g and one weight part of [$Y_2O_3:Eu$] (phosphor (9)) containing as an activator Eu in the amount of $5 \times 10^{-2}$ g/g were mixed thoroughly by using a mortar. A fluorescent composition capable of displaying red emission having high luminance and higher color purity than that of [ZnO:Zn] under low-velocity electron excitation was obtained. In the same manner as the above, other fluorescent compositions having different mixing ratios within the range of 1:9 to 9:1 (by weight) were prepared.

EXAMPLE 24

3 weight parts of reagent $In_2O_2$ (type I) and 7 weight parts of [$La_2O_2S:Tb$] (phosphor (1)-1)containing Tb in the activating amount of $5 \times 10^{-2}$ g/g were well-mixed by using a mortar. A 200 mg portion of the resulting mixture was dispersed into 100 ml of distilled water containing water glass in the concentration of 0.01%. The resulting suspension was applied to a 2 cm × 1 cm aluminium anodic plate supported on a ceramic base plate in accordance with the sedimentation coating method to make a fluorescent screen. The amount of the fluorescent composition applied was about 10 mg/cm². Next, a cathode made of a tungsten wire-heater covered with an oxide was placed across from the fluorescent screen on the aluminium anodic plate at the interval of about 5 mm. Then this pair of electrodes was set in a hard glass container and air present in the container was evacuated. After the pressure inside the container reached $10^{-5}$ Torr or so, the evacuation was stopped and the container was sealed. Next, the pressure inside the evacuated container was additionally reduced by sputtering a getter. Thus, a fluorescent display device having the structure as shown in FIG. (1) was obtained. The resulting fluorescent display device displayed green emission having a luminance of 3.5 ft-L under an anodic plate potential of 80 V, a cathode potential of 0.6 V and a cathode current of 40 mA.

EXAMPLE 25

Reagent $In_2O_3$ (type I) was placed in an alumina crucible and fired at 1400° C. for one hour in air. The resulting heat treated $In_2O_3$ was well-ground to a fine powder by means of a ball-mill. 3 weight parts of the thus obtained heat treated $In_2O_3$ and 7 weight parts of $[(La_{0.9}, Y_{0.1})_2O_2S:Tb]$ (phosphor (1)-2) containing Tb in the activating amount of $5\times10^{-2}$ g/g were fully mixed by using a mortar. A fluorescent display device was prepared in the same manner as in Example 24 except that the thus obtained fluorescent composition was employed. This fluorescent display device displayed green emission having a luminance of 4.0 ft-L under an anodic plate potential of 80 V, a cathode potential of 0.6 V and a cathode current of 40 mA.

EXAMPLE 26

Reagent $In_2O_3$ (type II) was placed in an alumina crucible and fired at 1200° C. for one hour in a weak reducing atmosphere consisting of 99% of nitrogen and 1% of hydrogen. The resulting heat treated $In_2O_3$ was well-ground to a fine powder. 3 weight parts of the thus obtained head treated $In_2O_3$ and 7 weight parts of $[(La_{0.5}, Y_{0.5})_2O_2S:Tb]$ (phosphor (1)-2) containing cerium in the activating amount of $5\times10^{-2}$ g/g were fully mixed by using a mortar. A fluorescent display device was prepared in the same manner as in Example 24 except that the thus obtained fluorescent composition was employed. This fluorescent display device displayed green emission having a luminance of 4.5 ft-L under an anodic plate potential of 80 V, a cathode potential of 0.6 V and a cathode current of 40 mA.

EXAMPLE 27

3 weight parts of reagent $In_2O_3$ (type I) and 7 weight parts of $[(La_{0.2}, Y_{0.8})_2O_2S:Tb]$ (phosphor (1)-2) containing as an activator Eu in the amount of $5\times10^{-2}$ g/g were mixed thoroughly by using a mortar. A fluorescent display device was prepared in the same manner as in Example 24 except that the thus obtained fluorescent composition was employed. This fluorescent display device displayed green emission having a luminance of 4.5 ft-L under an anodic plate potential of 80 V, a cathode potential of 0.6 V and a cathode current of 40 mA.

EXAMPLE 28

One weight part of reagent $In_2O_3$ (type I) and one weight part of $[ZnS:Cu,Al]$ (phosphor (2)-1) containing both Cu and Al in the equivalent amount of $10^{-4}$ g/g were mixed thoroughly by using a mortar. A fluorescent display device was prepared in the same manner as in Example 24 except that the thus obtained fluorescent composition was employed. This fluorescent display device displayed green emission having a luminance of 10 ft-L under an anodic plate potential of 80 V, a cathode potential of 0.6 V and a cathode current of 40 mA.

EXAMPLE 29

Reagent $In_2O_3$ (type I) was placed in an alumina crucible and fired at 1400° C. for one hour in air. The resulting heat treated $In_2O_3$ was well-ground to a fine powder by means of a ball-mill. One weight part of this heat treated $In_2O_3$ and one weight part of $[(Zn_{0.95}, Cd_{0.05})S:Cu, Al]$ (phosphor (2)-2) containing both Cu and Al in the equivalent amount of $10^{-4}$ g/g were fully mixed by using a mortar. A fluorescent display device was prepared in the same manner as in Example 24 except that the thus obtained fluorescent composition was employed. This fluorescent display device displayed green emission having a luminance of 8 ft-L under an anodic plate potential of 80 V, a cathode potential of 0.6 V and a cathode current of 40 mA.

EXAMPLE 30

One weight part of reagent $In_2O_3$ (type II) and one weight part of $[SrGa_2S_4:Eu^{2+}]$ (phosphor (3)) containing as an activator $Eu^{2+}$ in the amount of $3\times10^{-2}$ gram.atom/mole were mixed thoroughly by using a mortar. A fluorescent display device was prepared in the same manner as in Example 24 except that the thus obtained fluorescent composition was employed. This fluorescent display device displayed green emission having a luminance of 6.5 ft-L under an anodic plate potential of 80 V, a cathode potential of 0.6 V and a cathode current of 40 mA.

EXAMPLE 31

Reagent $In_2O_3$ (type II) was placed in an alumina crucible and fired at 1200° C. for one hour in a weak reducing atmosphere consisting of 98% of nitrogen and 2% of hydrogen. The resulting heat treated $In_2O_3$ was well-ground to a fine powder by means of a ball-mill. One weight part of this heat treated $In_2O_3$ and one weight part of $[Y_3Al_5O_{12}:Ce]$ (phosphor (4)-1) containing Ce in the amount of $10^{-2}$ gram.atom/mole were fully mixed by using a mortar. A fluorescent display device was prepared in the same manner as in Example 24 except that the thus obtained fluorescent composition was employed. This fluorescent display device displayed green emission having a luminance of 6 ft-L under an anodic plate potential of 80 V, a cathode potential of 0.6 V and a cathode current of 40 mA.

EXAMPLE 32

One weight part of reagent $In_2O_3$ (type I) and one weight part of $[Y_3(Al_{0.6}, Ga_{0.4})_5O_{12}:Ce]$ (phosphor (4)-2) containing as an activator Ce in the amount of $10^{-2}$ gram.atom/mole were mixed thoroughly by using a mortar. A fluorescent display device was prepared in the same manner as in Example 24 except that the thus obtained fluorescent composition was employed. This fluorescent display device displayed green emission having a luminance of 7 ft-L under an anodic plate potential of 80 V, a cathode potential of 0.6 V and a cathode current of 40 mA.

EXAMPLE 33

Reagent $In_2O_3$ (type I) was placed in an alumina crucible and fired at 1200° C. for one hour in air. The resulting heat treated $In_2O_3$ was well-ground to a fine powder by means of a ball-mill. One weight part of this heat treated $In_2O_3$ and one weight part of $[Zn_2SiO_4:Mn]$ (phosphor (5)) containing Mn in the amount of $2\times10^{-2}$ gram.atom/mole were fully mixed by using a mortar. A fluorescent display device was prepared in the same manner as in Example 24 except that the thus obtained fluorescent composition was employed. This fluorescent display device displayed green emission having a luminance of 4 ft-L under an anodic plate potential of 80 V, a cathode potential of 0.6 V and a cathode current of 40 mA.

EXAMPLE 34

One weight part of reagent $In_2O_3$ (type II) and one weight part of $[Y_2O_2S:Tb]$ (phosphor (6)) containing as an activator Tb in the amount of $5 \times 10^{-2}$ g/g were mixed thoroughly by using a mortar. A fluorescent display device was prepared in the same manner as in Example 24 except that the thus obtained fluorescent composition was employed. This fluorescent display device displayed green emission having a luminance of 4 ft-L under an anodic plate potential of 80 V, a cathode potential of 0.6 V and a cathode current of 40 mA.

EXAMPLE 35

2 weight parts of reagent $In_2O_3$ (type I) and one weight part of [$Zn_2SiO_4$:Mn] (phosphor (5)) containing as an activator Mn in the amount of $2 \times 10^{-2}$ gram.atom/mole and one weight part of [$SrGa_2S_4$:$Eu^{2+}$] (phosphor (3)) containing as an activator $Eu^{2+}$ in the amount of $3 \times 10^{-2}$ gram.atom/mole were mixed thoroughly by using a mortar. A fluorescent display device was prepared in the same manner as in Example 24 except that the thus obtained fluorescent composition was employed. This fluorescent display device displayed green emission having a luminance of 5 ft-L under an anodic plate potential of 80 V, a cathode potential of 0.6 V and a cathode current of 40 mA.

EXAMPLE 36

Indium sulfate [$In_2(SO_4)_3.9H_2O$] was placed in an alumina crucible and fired at 1000° C. for one hour in air. The resulting heat treated $In_2O_3$ was well-ground to a fine powder by means of a ball-mill. 2 weight parts of this heat treated $In_2O_3$, one weight part of [ZnS:Cu, Al] (phosphor (2)-1) containing both Cu and Al in the equivalent amount of $10^{-4}$ g/g and one weight part of [$Zn_2SiO_4$:Mn] (phosphor (5)) containing Mn in the amount of $2 \times 10^{-2}$ gram.atom/mole were fully mixed by using a mortar. A fluorescent display device was prepared the same as in Example 24 except that the thus obtained fluorescent composition was employed. This fluorescent display device displayed green emission having a luminance of 7 ft-L under an anodic plate potential of 80 V, a cathode potential of 0.6 V and a cathode current of 40 mA.

EXAMPLE 37

One weight part of reagent $In_2O_3$ (type I) and one weight part of [ZnS:Ag] (phosphor (7)) containing as an activator Ag in the amount of $10^{-4}$ g/g were mixed thoroughly by using a mortar. A fluorescent display device was prepared in the same manner as in Example 24 except that the thus obtained fluorescent composition was employed. This fluorescent display device displayed blue emission having a luminance of 4 ft-L under an anodic plate potential of 80 V, a cathode potential of 0.6 V and a cathode current of 40 mA.

EXAMPLE 38

Reagent $In_2O_3$ (type II) was placed in an alumina crucible and fired at 1400° C. for one hour in air. The resulting heat treated $In_2O_3$ was well-ground to a fine powder by means of a ball-mill. One weight part of this heat treated $In_2O_3$ and one weight part of [ZnS:Ag] (phosphor (7)) containing Ag in the amount of $10^{-4}$ g/g were fully mixed by using a mortar. A fluorescent display device was prepared in the same manner as in Example 24 except that the thus obtained fluorescent composition was employed. This fluorescent display device displayed blue emission having a luminance of 3 ft-L under an anodic plate potential of 80 V, a cathode potential of 0.6 V and a cathode current of 40 mA.

EXAMPLE 39

Reagent $In_2O_3$ (type I) was placed in an alumina crucible and fired at 1200° C. for one hour in a weak reducing atmosphere consisting of 98% of nitrogen and 2% of hydrogen. The resulting heat treated $In_2O_3$ was well-ground to a fine powder by means of a ball-mill. 3 weight parts of this heat treated $In_2O_3$ and 7 weight parts of [ZnS:Ag] (phosphor (7)) containing Ag in the amount of $10^{-4}$ g/g were fully mixed by using a mortar. A fluorescent display device was prepared in the same manner as in Example 24 except that the thus obtained fluorescent composition was employed. This fluorescent display device displayed blue emission having a luminance of 3.5 ft-L under an anodic plate potential of 80 V, a cathode potential of 0.6 V and a cathode current of 40 mA.

EXAMPLE 40

Indium sulfate [$In_2(SO_4)_3.9H_2O$] was placed in an alumina crucible and fired at 1000° C. for one hour in air. The resulting heat treated $In_2O_3$ was well-ground to a fine powder by means of a ball-mill. One weight part of the thus obtained heat treated ZnO and one weight part of [ZnS:Ag] (phosphor (7)) containing Ag in the activating amount of $10^{-4}$ g/g were fully mixed by using a mortar. A fluorescent display device was prepared in the same manner as in Example 24 except that the thus obtained fluorescent composition was employed. This fluorescent display device displayed blue emission having a luminance of 3 ft-L under an anodic plate potential of 80 V, a cathode potential of 0.6 V and a cathode current of 40 mA.

EXAMPLE 41

One weight part of reagent $In_2O_3$ (type I) and one weight part of [$Y_2O_2S$:Eu] (phosphor (8)) containing as an activator Eu in the amount of $5 \times 10^{-2}$ g/g were mixed thoroughly by using a mortar. A fluorescent display device was prepared in the same manner as in Example 24 except that the thus obtained fluorescent composition was employed. This fluorescent display device displayed red emission having a luminance of 4.5 ft-L under an anodic plate potential of 80 V, a cathode potential of 0.6 V and a cathode current of 40 mA.

EXAMPLE 42

Reagent $In_2O_3$ (type II) was placed in an alumina crucible and fired at 1400° C. for one hour in air. The resulting heat treated $In_2O_3$ was well-ground to a fine powder by means of a ball-mill. 3 weight parts of this heat treated $In_2O_3$ and 7 weight parts of [$Y_2O_2S$:Eu] (phosphor (8)) containing Eu in the amount of $5 \times 10^{-2}$ g/g were fully mixed by using a mortar. A fluorescent display device was prepared in the same manner as in Example 24 except that the thus obtained fluorescent composition was employed. This fluorescent display device displayed red emission having a luminance of 4 ft-L under an anodic plate potential of 80 V, a cathode potential of 0.6 V and a cathode current of 40 mA.

EXAMPLE 43

Indium sulfate [$In_2(SO_4)_3.9H_2O$] was placed in an alumina crucible and fired at 1000° C. for one hour in air. The resulting heat treated $In_2O_3$ was well-ground to a fine powder by means of a ball-mill. One weight part of the thus obtained heat treated ZnO and one weight part of [$Y_2O_2S$:Eu] (phosphor (8)) containing $Eu^{2+}$ in the amount of $5\times 10^{-2}$ g/g were fully mixed by using a mortar. A fluorescent display device was prepared in the same manner as in Example 24 except that the thus obtained fluorescent composition was employed. This fluorescent display device displayed red emission having a luminance of 3.5 ft-L under an anodic plate potential of 80 V, a cathode potential of 0.6 V and a cathode current of 4 mA.

EXAMPLE 44

One weight part of reagent $In_2O_3$ (type II) and one weight part of [$Y_2O_3$:Eu] (phosphor (9)) containing as an activator $Eu^{2+}$ in the amount of $5\times 10^{-2}$ g/g were mixed thoroughly by using a mortar. A fluorescent display device was prepared in the same manner as in Example 24 except that the thus obtained fluorescent composition was employed. This fluorescent display device displayed red emission having a luminance of 1.3 ft-L under an anodic plate potential of 80 V, a cathode potential of 0.6 V and a cathode current of 40 mA.

EXAMPLE 45

Reagent $In_2O_3$ (type I) was placed in an alumina crucible and fired at 1200° C. for one hour in a weak reducing atmosphere consisting of 98% of nitrogen and 2% of hydrogen. The resulting heat treated $In_2O_3$ was well-ground to a fine powder by means of a ball-mill. 3 weight parts of this heat treated $In_2O_3$ and 7 weight parts of [$YVO_4$:Eu] (phosphor (10)) containing $Eu^{2+}$ in the amount of $7\times 10^{-2}$ g/g were fully mixed by using a mortar. A fluorescent display device was prepared in the same manner as in Example 24 except that the thus obtained fluorescent composition was employed. This fluorescent display device displayed red emission having a luminance of 1.5 ft-L under an anodic plate potential of 80 V, a cathode potential of 0.6 V and a cathode current of 40 mA.

EXAMPLE 46

2 weight parts of reagent $In_2O_3$ (type I) and one weight part of [$Y_2O_2S$:Eu] (phosphor (8)) containing as an activator Eu in the amount of $5\times 10^{-2}$ g/g and one weight part of [$Y_2O_3$:Eu] (phosphor (9)) containing as an activator Eu in the amount of $5\times 10^{-2}$ g/g were mixed thoroughly by using a mortar. A fluorescent display device was prepared in the same manner as in Example 24 except that the thus obtained fluorescent composition was employed. This fluorescent display device displayed red emission having a luminance of 3 ft-L under an anodic plate potential of 80 V, a cathode potential of 0.6 V and a cathode current of 40 mA.

We claim:

1. A low-velocity electron excited fluorescent display device comprising an anodic plate having a fluorescent screen on one side thereof, a cathode standing face to face with said fluorescent screen and a sealed evacuated tube in which said anodic plate and said cathode are enclosed wherein said fluorescent screen is comprised of a fluorescent composition comprising a mechanical mixture of indium oxide ($In_2O_3$) and a silver activated zinc sulfide phosphor (ZnS:Ag) said indium oxide and said phosphor being present in a weight ratio of 1:9 to 9:1, the amount of silver contained in said phosphor being from $10^{-5}$ to $10^{-3}$ gram per one gram of zinc sulfide.

2. A low velocity electron excited fluorescent display device as defined in claim 1 wherein the amount of silver contained in said phosphor is from $5\times 10^{-5}$ to $5\times 10^{-4}$ gram per one gram of zinc sulfide.

* * * * *

UNITED STATES PATENT OFFICE
CERTIFICATE OF CORRECTION

Patent No. 4,208,613　　　　　　　　　Dated　June 17, 1980

Inventor(s) TAKASHI HASE ET AL

It is certified that error appears in the above-identified patent and that said Letters Patent are hereby corrected as shown below:

Change the name of the assignee from "Dai Nippon Toryo Co., Ltd., Osaka, Japan" to --Kasei Optonix, Ltd., Tokyo, Japan--.

Signed and Sealed this

Third Day of February 1981

[SEAL]

Attest:

RENE D. TEGTMEYER

Attesting Officer　　　Acting Commissioner of Patents and Trademarks